United States Patent
Marple et al.

(10) Patent No.: US 10,205,206 B2
(45) Date of Patent: Feb. 12, 2019

(54) ZINC-AIR ELECTROCHEMICAL CELL

(71) Applicant: Energizer Brands, LLC, Saint Louis, MO (US)

(72) Inventors: Jack W. Marple, Avon, OH (US); Thomas J. Sherry, North Olmsted, OH (US)

(73) Assignee: Energizer Brands, LLC, St. Louis, MO (US)

( * ) Notice: Subject to any disclaimer, the term of this patent is extended or adjusted under 35 U.S.C. 154(b) by 185 days.

(21) Appl. No.: 15/041,739

(22) Filed: Feb. 11, 2016

(65) Prior Publication Data

US 2017/0237133 A1 Aug. 17, 2017

(51) Int. Cl.
*H01M 12/06* (2006.01)
*H01M 4/62* (2006.01)
*H01M 4/88* (2006.01)

(52) U.S. Cl.
CPC ......... *H01M 12/06* (2013.01); *H01M 4/8875* (2013.01); *H01M 4/8896* (2013.01)

(58) Field of Classification Search
CPC ...... H01M 12/06; H01M 4/8896; H01M 4/88; H01M 4/8652; H01M 4/8657; H01M 4/9016; H01M 4/9083; H01M 4/96; H01M 4/38; H01M 6/185; H01M 6/188; H01M 8/1016; H01M 8/1007; H01M 4/9638
USPC .................. 429/406, 528, 532, 232
See application file for complete search history.

(56) References Cited

U.S. PATENT DOCUMENTS

| | | | |
|---|---|---|---|
| 4,195,120 A | 3/1980 | Rossler et al. | |
| 4,777,100 A | 10/1988 | Chalilpoyil et al. | |
| 5,300,394 A | 4/1994 | Miller et al. | |
| 5,312,476 A | 5/1994 | Uemura et al. | |
| 5,378,562 A | 1/1995 | Passaniti et al. | |
| 5,401,590 A | 3/1995 | Chalilpoyil et al. | |
| 5,419,977 A * | 5/1995 | Weiss ................ | H01M 10/4264 429/303 |
| 5,464,709 A | 11/1995 | Getz et al. | |
| 5,677,084 A | 10/1997 | Tsukamoto et al. | |

(Continued)

FOREIGN PATENT DOCUMENTS

| | | |
|---|---|---|
| AU | 2005225138 A1 | 5/2006 |
| AU | 2004210507 B2 | 10/2009 |

(Continued)

OTHER PUBLICATIONS

BASF, "Kollicoat IR: Polyvinyl alcohol-polyethylene glycol graft copolymer for instant-release coatings and quick-dissolving formulations", *BASF Technical Information*, Feb. 2013, 14 pages, retrieved from <https://www.google.com/?gws_rd=ssl#q=kollicoat+ir+technical+information+basf+2013>on Jan. 14, 2017.

(Continued)

*Primary Examiner* — Sean P Cullen
(74) *Attorney, Agent, or Firm* — Alston & Bird LLP

(57) ABSTRACT

A multi-faceted zinc-air electrochemical cell design holistically leverages interactions between components, especially with respect to conductive carbons from differing sources, lamination and the resulting impact it has on the air electrode's surface and other additives that impact the relative hydrophilicity of the membrane and/or performance of the anode, to improve the overall reliability and performance of the resulting battery.

6 Claims, 8 Drawing Sheets

(56) References Cited

U.S. PATENT DOCUMENTS

| | | |
|---|---|---|
| 6,203,943 B1 | 3/2001 | Bennett et al. |
| 6,551,742 B1 | 4/2003 | Huq et al. |
| 6,602,629 B1 | 8/2003 | Guo et al. |
| 6,780,347 B2 | 8/2004 | Ndzebet |
| 6,872,489 B2 | 3/2005 | Armacanqui et al. |
| 6,939,630 B2 | 9/2005 | Sotomura et al. |
| 6,967,038 B2 | 11/2005 | O'Brien |
| 7,008,723 B2 | 3/2006 | Daniel Ivad et al. |
| 7,208,248 B2 | 4/2007 | Hayashi et al. |
| 7,563,537 B2 | 7/2009 | Pratt et al. |
| 7,615,508 B2 | 11/2009 | Kaplan et al. |
| 7,754,381 B2 | 7/2010 | Fujino et al. |
| 7,993,508 B2 | 8/2011 | Stimits et al. |
| 8,586,244 B2 | 11/2013 | Fensore et al. |
| 8,652,685 B2 | 2/2014 | Guo et al. |
| 8,945,736 B2 | 2/2015 | Uensal et al. |
| 8,999,874 B2 | 4/2015 | Kishimoto et al. |
| 9,136,540 B2 | 9/2015 | Padhi et al. |
| 2004/0229107 A1 | 11/2004 | Smedley |
| 2005/0287438 A1* | 12/2005 | Bernard ............... H01M 4/624 429/223 |
| 2007/0092429 A1 | 4/2007 | Mao et al. |
| 2007/0154704 A1 | 7/2007 | Debergalis et al. |
| 2007/0160898 A1 | 7/2007 | Takamura et al. |
| 2008/0096074 A1* | 4/2008 | Wu ..................... H01M 2/0222 429/406 |
| 2008/0155813 A1 | 7/2008 | Dopp |
| 2008/0241683 A1 | 10/2008 | Fensore |
| 2009/0320718 A1 | 12/2009 | Hierse et al. |
| 2011/0143253 A1 | 6/2011 | Miyata et al. |
| 2011/0265669 A1 | 11/2011 | Padberg |
| 2012/0111233 A1 | 5/2012 | Hierse et al. |
| 2013/0162216 A1* | 6/2013 | Zhamu ................. H01G 11/06 320/130 |
| 2015/0244000 A1 | 8/2015 | Ozaki et al. |
| 2016/0226281 A1* | 8/2016 | Gadkaree ............. H01G 11/06 |

FOREIGN PATENT DOCUMENTS

| | | |
|---|---|---|
| CA | 2216823 A1 | 3/1998 |
| CA | 2716012 A1 | 10/2009 |
| CA | 2321313 C | 12/2009 |
| CA | 2795492 A1 | 10/2011 |
| CA | 2472557 C | 12/2014 |
| DE | 102006031143 A1 | 1/2008 |
| EP | 2053674 B1 | 12/2012 |
| EP | 2654107 A1 | 10/2013 |
| WO | WO 2003/052843 A2 | 6/2003 |
| WO | WO 2008/051508 A2 | 5/2008 |
| WO | WO 2009/016521 A2 | 2/2009 |
| WO | WO 2016/057666 A1 | 4/2016 |
| WO | WO 2016/065230 A1 | 4/2016 |

OTHER PUBLICATIONS

International Searching Authority, International Search Report and Written Opinion for International Application No. PCT/US2015/054489, dated Dec. 29, 2015, 8 pages, United States Patent and Trademark Office, U.S.A.

International Searching Authority, International Search Report and Written Opinion for International Application No. PCT/US2015/057063, dated Jan. 22, 2016, 6 pages, United States Patent and Trademark Office, U.S.A.

Toon, John, "Smart Hydrogel Coating Creates "Stick-slip" Control of Capillary Action", Georgia Tech News Center, Jul. 27, 2015, 5 pages, retrieved from <http://www.news.gatech.edu/2015/07/25/smart-hydrogel-coating-creates-%E2%80%9Cstick-slip%E2%80%9D-control-capillary-action> on Jan. 14, 2017.

Usui, Hiroyuke, et al., "Novel Composite Thick-Film Electrodes Consisted of Zinc Oxide and Silicon for Lithium-Ion Battery Anode", International Journal of Electrochemical Science, 2012 (published May 1, 2012), pp. 4322-4334, vol. 7, retrieved from <http://www.electrochemsci.org/papers/vol7/7054322.pdf> on Jan. 14, 2017.

Robert Pfeffer, Synthesis of Engineered Particulates With Tailored Properties Using Dry Particle Coating, Powder Technology 117, 2001, 40-67.

Jun Yang, Dry Particle Coating for Improving the Flowability of Cohesive Powders, Powder Technology 158, 2005, 21-33.

Vladimir Neburchilov, A Review on Air Cathodes for Zinc-Air Fuel Cells, Journal of Power Sources 195, 2010, 1271-1291.

Pund, K., "Recovery Act: Nanoengineered Ultracapacitator Material Surpasses the $/kW Threshold for Use in EDV's," EnerG2, May 16, 2012. http://www1.eere.energy.gov/vehiclesandfuels/pdfs/merit_review_2012/energy_storage/arravt011_es_pund_2012_p.pdf.

ENERG2 Press Release "EnerG2 nano-structured hard carbon boosts Li-ion anode capacity by >50% compared to standard graphite," Mar. 27, 2013, http://www.greencarcongress.com/2013/03/energ2-20130327.html.

* cited by examiner

3D Front View Press-o-Film 20

3D Side View Press-o-Film 20

ZINC-AIR ELECTROCHEMICAL CELL

CROSS REFERENCE TO RELATED APPLICATIONS

This application is a continuation-in-part of PCT patent application number PCT/US2015/054489 filed on Oct. 7, 2015, which claims priority to U.S. provisional patent application Ser. No. 62/061,348 filed on Oct. 8, 2014. This application is also a continuation-in-part of PCT patent application number PCT/US2015/057063 filed on Oct. 23, 2015, which is a continuation-in-part of International Application No. PCT/US2015/054489 filed Oct. 7, 2015, and claims priority to U.S. provisional patent application Ser. No. 62/067,756 filed on Oct. 23, 2014.

FIELD OF INVENTION

The present invention relates to an electrochemical cell design for zinc-air batteries. In particular, the selection of conductive carbons, means of laminating/structuring the air electrode and selectively using additives, potentially in the air electrode and/or in the zinc, can be coordinated to improve the overall reliability and performance of the resulting battery.

BACKGROUND

Zinc-air electrochemical cells are finding increasing use in small devices, such as hearing aids. These devices are trending toward higher drain rates and/or higher functional end point voltages, at least partially in response to increased usage of wireless protocols and a more competitive landscape fueled by a growing population of people who need hearing aids.

Zinc-air batteries rely on oxygen from the atmosphere to act as the cathode reactant. The air diffuses into the cell through an air electrode structure that catalytically promotes the reduction of oxygen in the presence of an aqueous electrolyte. The resulting cell possesses a high energy density, owing to the fact that only one electrode material (zinc) must be provided, but relatively low power output/rate capability. Also, the reliance upon ambient air means that once the air electrode structure is exposed, the cell may dry out.

One of the challenges in designing zinc-air batteries relates to the multiplicity of potential components in both the positive (air) and negative (zinc) electrodes which can influence the overall performance of the cell, both in terms of capacity and rate capability. In the air electrode, a failure to properly engineer the external face (i.e., the side of the electrode exposed to the ambient atmosphere) with sufficient hydrophobic properties could lead to unwanted moisture "flooding" the electrode surface and impeding performance, whereas a corresponding absence of hydrophilicity on the opposing, internal side could impede the mechanisms necessary for the electrochemical reaction to proceed at an optimal rate. In the zinc electrode, gassing, passivation and/or other unwanted interactions between the active and inactive components can have deleterious effects. In both cases, the use of inactive additives and components to potentially mitigate these effects must be balanced against the desired performance traits, insofar as inactive components occupy volume in the cell that could otherwise be devoted to active material(s).

Many past attempts at improving zinc-air cell performance have focused on a single component or single additive. In doing so, these solutions often failed to consider or acknowledge the corresponding, and sometimes negative, effects that these single component/additive solution have on the other aspects of the cell design.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

Figure 1:
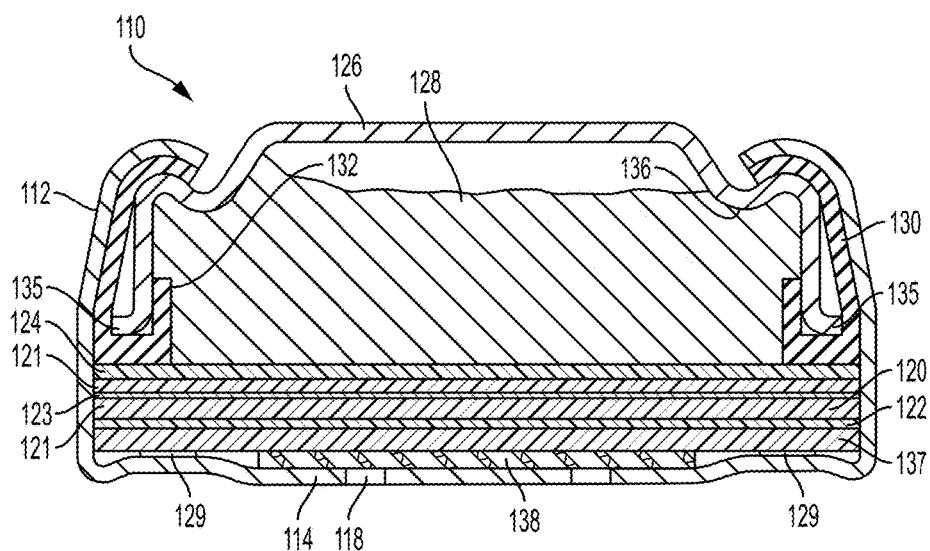
FIG. 1 illustrates an elevational view, in cross-section, of a metal-air cell with a catalytic electrode.

As shown in an example of an electrochemical cell according to the invention is shown in FIG. 1. The cell 110 can include a cathode casing 112 and an anode casing 126. At least one aperture 118 is present in the cathode casing 112 to act as an air or oxygen entry port. A catalytic positive electrode (such as an air electrode) 120 is disposed near the aperture 118 in the cathode casing 112.

The catalytic electrode 120 can include a catalytic layer containing a mixture of carbon, a catalyst, and a binder. Catalytic electrode 120 preferably has a barrier layer 122 laminated thereon. The barrier layer 122 can be laminated on the side of the catalytic electrode closest to the aperture 118 cell. Catalytic electrode 120 can also contain an electrically conductive current collector 123 embedded therein, preferably on the side of the electrode opposite the barrier layer 122. The cell 110 may optionally contain a second barrier layer 137 between the first barrier layer 122 and central region 114 of the surface of the cathode casing 112 containing the aperture 118. The barrier layers 122, 137 have a low enough surface tension to be resistant to wetting by electrolyte, yet porous enough to allow oxygen to enter the electrode at a rate sufficient to support the desired maximum cell reaction rate. Certain aspects of the barrier layers 122, 137 and/or the catalytic electrode 120, including the selection of conductors, lamination of the constituent components and methods of manufacturing these components are related to the synergistic benefits inherent to this invention and, consequently, will be described in greater detail below.

At least one layer of separator 124 is positioned on the side of the catalytic electrode 120 facing the anode 128. The separator 124 is ionically conductive and electrically non-conductive. The total thickness of the separator 124 is preferably thin to minimize its volume, but must be thick and strong enough to prevent short circuits between the anode 128 and catalytic electrode 120. The separator 124 can be adhered to the surface of the catalytic electrode 120 to provide good ion transport between the electrodes and to prevent the formation of gas pockets between the catalytic electrode 120 and the separator 124. Similarly, adjacent layers of the separator 124 can be adhered to each other. A layer of porous material 138 can be positioned between catalytic electrode 120 and the surface of cathode casing 112 to evenly distribute oxygen to catalytic electrode 120.

A catalytic layer 121 contains a catalytic composition that includes composite particles comprising catalyst or nanocatalyst particles adhered to (e.g., adsorbed onto) the external and internal surfaces (including surfaces of open pores) of highly porous carbon substrate particles. As will be discussed in greater detail below, the inventors have now found that the selection and utilization of different, specific types of carbon from different, specific sources appears to have an unexpected, synergistic effect on cell performance when these multiple carbons are used with other features described herein.

Examples of zinc air cell cathode construction that can be used in conjunction with the present invention are disclosed in U.S. Patent Application Publication No. 2008/0155813 A1. Cell sizes of particular applicability to the invention include International Electrotechnical Commission (IEC) standard cell designations PR536, PR41, PR48 and PR44 (commonly referred to as hearing aid battery sizes 10, 312, 13 and 675, respectively), although additional designations and form factors may be amenable to the concepts disclosed herein. Consequently, certain parameters of the invention will be expressed on a standardized surface area basis to allow comparison and conversion between these varying cell sizes.

A sealant 129 can be used to bond portions of the catalytic electrode 120 to the cathode casing 112. The anode casing 126 can have a rim 135 that is flared outward at its open end. Alternatively, a cell can essentially straight side walls with little or no outward flare or a rim that is folded outward and back along the side wall to form a substantially U-shaped side wall with a rounded edge at the open end of the casing. The anode casing 126 can have an inner surface 136 in contact with the anode mixture 128 and electrolyte.

Cell 110 can includes a gasket 130, made from an elastomeric material for example, to provide a seal between the cathode casing 112 and anode casing 126. The bottom edge of the gasket 130 can be formed to create an inwardly facing lip 132, which abuts the rim of anode casing 126. Optionally, a sealant may be applied to the sealing surfaces of the gasket 130, cathode casing 112 and/or anode casing 126. A suitable tab (not shown) can be placed over the openings 118 until the cell 110 is ready for use, to keep air from entering the cell 110 before use.

The anode casing 126 forms the top of the cell and has a rim 135 which is flared outward at its open end. Alternatively, a cell can have a refold anode casing in which the rim is folded outward and back along the side wall to form a substantially U-shaped side wall with a rounded edge at the open end of the casing, or the anode casing can have essentially straight side walls and that has a rim with little or no outward flare.

The anode casing 126 can be formed from a substrate including a material having a sufficient mechanical strength for the intended use such as stainless steel, mild steel, cold rolled steel, aluminum, titanium or copper. Preferably the anode casing includes one or more additional layers of material to provide good electrical contact to the exterior surface of the anode casing 126, resistance of the external surface to corrosion, and resistance to internal cell gassing where the internal surface of the anode casing 126 comes in contact with the anode 128 or electrolyte. Each additional layer can be a metal such as nickel, tin, copper, or indium, or a combination or alloy thereof, and layers can be of the same or different metals or alloys. Examples of plated substrates include nickel plated steel, nickel plated mild steel and nickel plated stainless steel. Examples of clad materials (i.e., laminar materials with at least one layer of metal bonded to another layer of metal) include, as listed in order from an outer layer to an inner layer, two-layered (biclad) materials such as stainless steel/copper, three-layered (triclad) materials such as nickel/stainless steel/copper and nickel/mild steel/nickel, and materials with more than three clad layers.

The anode casing 126 can include a layer that is post-plated (i.e., plated after forming the anode casing into its desired shape). The post-plated layer is preferably a layer of metal with a high hydrogen overvoltage to minimize hydrogen gassing within the cell 110. Examples of such metals are copper, tin, zinc, indium and alloys thereof. A preferred metal is tin, and a preferred alloy is one comprising copper, tin and zinc.

Cell 110 also includes a gasket 130 made from an elastomeric material which serves as the seal. The bottom edge of the gasket 130 has been formed to create an inwardly facing lip 132, which abuts the rim of anode casing 126. Optionally, a sealant may be applied to the sealing surface of the gasket, cathode casing and/or anode casing. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene.

During manufacture of the cell, anode casing 126 can be inverted, and then a negative electrode composition or anode mixture 128 and electrolyte put into anode casing 126. The anode mixture insertion can be a two-step process wherein dry anode mixture materials are dispensed first into the anode casing 126 followed by KOH solution dispensing. Alternatively, the wet and dry components of the anode mixture are preferably blended beforehand and then dispensed in one step into the anode casing 126. Electrolyte can creep or wick along the inner surface 136 of the anode casing 126, carrying with it materials contained in anode mixture 128 and/or the electrolyte. The amount of the electrolyte dispensed takes into account both the desired electrolyte to zinc ratio (a weight ratio) and the void volume desired within the cell.

An example of an anode mixture 128, for a button cell comprises a mixture of zinc, electrolyte, and organic compounds. The anode mixture 128 preferably includes zinc powder, a binder such as CARBOPOL® 940 or CARBOPOL® 934, and a gassing inhibitor such as indium hydroxide (In(OH)$_3$) in amounts of about 99.7 weight percent zinc, about 0.25 weight percent binder, and about 0.045 weight percent indium hydroxide. CARBOPOL® 934 and CARBOPOL® 940 are acrylic acid polymers in the 100% acid form and are available from Noveon Inc. of Cleveland, Ohio. A preferred alternative gelling agent is SANFRESH™ DK-300 a sodium salt of an acrylic acid polymer available from Sanyo Chemical Industries Ltd., Kyoto, Japan.

The electrolyte composition for a button cell can be a mixture of about 97 weight percent potassium hydroxide (KOH) solution where the potassium hydroxide solution is 28-40 weight percent, preferably 30-35 weight percent, and more preferably about 33 weight percent aqueous KOH solution, and about 1.00 to 3.00 weight percent zinc oxide (ZnO). Any specific whole integers between the stated ranges for potassium hydroxide weight percent are contemplated (e.g., 29, 34, 38, etc.), as are one tenth increments for weight percent zinc oxides (e.g., 1.10, 2.30, 2.70, etc.).

Nano zinc oxide can also be added to the anode and can provide advantages relative regular zinc oxide. It should be noted that nano zinc oxide is available from several sources today based on its use in paints. For example; Bruggemann Chemical, NanoPhase Technologies, and Grillo provide nano zinc oxide. Surface areas can range from 20 to 100 square meters per gram. Additional, more preferred upper limits includes 100, 90, 80, 70, 60, 50, 40 or 30 square meters per gram, whereas the lower limits may be 20, 30, 40, 50, 60, 70, 80 or 90 square meters per gram. These upper and lower limits may be paired in any combination (e.g., 20 to 70; 40 to 100; 70 to 80; etc.).

Preferred zinc powders are low-gassing zinc compositions suitable for use in alkaline cells with no added mercury. Examples are disclosed in U.S. Pat. No. 6,602,629 (Guo et al.), U.S. Pat. No. 5,464,709 (Getz et al.) and U.S. Pat. No. 5,312,476 (Uemura et al.), which are hereby incorporated by reference.

One example of a low-gassing zinc is ZCA grade 1230 zinc powder from Zinc Corporation of America, Monaca, Pa., which is a zinc alloy containing about 400 to about 550 parts per million (ppm) of lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and germanium preferably total no more than 68 ppm of the zinc powder composition by weight. More preferably, the zinc powder contains no more than the following amounts of iron, cadmium, copper, tin, chromium, nickel, molybdenum, arsenic, vanadium, antimony, and germanium, based on/the weight of zinc: Fe—3.0 ppm, Cd—8 ppm, Cu—8 ppm, Sn—1 ppm, Cr—1 ppm, Ni—1 ppm, Mo—0.25 ppm, As—0.1 ppm, Sb—0.2 ppm, V—1 ppm, and Ge—0.06 ppm. The lower preferred limit for each of the impurities identified in this paragraph would be as close to 0 ppm as is reasonably practical.

In another embodiment, the zinc powder preferably is a zinc alloy composition containing bismuth, indium and aluminum. The zinc alloy preferably contains about 100 ppm of bismuth, 200 ppm of indium, and 100 ppm of aluminum. The zinc alloy preferably contains a low level of lead, such as about 35 ppm or less. In a preferred embodiment, the average particle size (D50) is about 90 to about 120 microns. Examples of suitable zinc alloys include product grades NGBIA 100, NGBIA 115, and BIA available from N.V. Umicore, S.A., Brussels, Belgium. The values stated for zinc alloy compositions are nominal, and other useful levels of alloys may be possible.

The selection of zinc additives, for corrosion control, can be very challenging. Since these additives are often surfactants and other agents which have interactions with other components, they can influence viscosity and rheology properties.

Surfactants form films on the zinc surface which impact cell impedance and rate capability, and can influence the solubility of ZnO. They are often extremely concentration dependent which further complicates their evaluation. Surfactants used in zinc air cell anode formulations such as Disperbyk 102 and Carbowax 550 are extremely concentration sensitive and have significant impact on front end rate capability and cell impedance. It is desired to use a zinc additive which forms a thin but dense film on the zinc surface and is robust to concentration effects above the monolayer requirement.

In order to find a zinc additive that provides a thin but dense film on the surface of zinc which effectively reduces corrosion without having a negative impact on cell impedance and high rate performance, a sulfotricarballylate which is a fluorosurfactant with short chain, branched fluorocarbon end groups and carboxylate acid anchor groups was used as a zinc additive in an alkaline zinc air cell. The sulfotricarballylate is available as Tivida L2300 from EMD Millipore, also known as Merck Millipore outside the United States and Canada.

PCT patent application number US15/54489, filed on Oct. 7, 2015, discloses short-branched chain fluorosurfactants that may be useful as zinc corrosion inhibitors in electrochemical cells. The disclosure of this application is incorporated by reference herein as examples of other preferred surfactants for use in the invention.

PCT patent application number US/15/57063, filed on Oct. 23, 2015, discloses the use of functionalized barium sulfate as an additive in zinc-air and zinc-manganese dioxide electrochemical cells. The disclosure of this application is incorporated by reference herein as examples of other preferred additives for use in the invention.

Numerous carbons have been used in electrochemical cells to improve discharge performance characteristics. These include carbon black, acetylene black and graphite and, generally speaking, each is an elemental carbon characterized by a pre-defined set of physical characteristics and method of manufacture. For example, carbon black is typically made by combustion/thermal decomposition of hydrocarbons, with acetylene black being a particular, highly pure form of carbon black. Additional physical or chemical treatment of carbon black can impart or influence the presence of "active" functional groups. In contrast, graphite is a carbon allotrope in its natural form or produced synthetically. In either case, graphite can be subjected to further chemical and/or mechanical treatment to impart certain desired characteristics or properties, such as crystalline structure, texture (as characterized by xylene density, BET specific surface area, bulk density, tap density, etc.), particle size, morphology, purity and/or spacing between its crystal lattice planes. In all cases, graphite exhibits a density that is almost identical to that of activated carbon (i.e., ~2.2 g/cm$^3$), but it has a BET surface area that is significantly smaller (e.g., usually <20 m$^2$/g for synthetic types and 10 m$^2$/g for natural types).

Carbon blacks are sold by numerous entities, including Timcal of Westlake, Ohio, U.S.A. Various acetylene black powders are sold by numerous entities, including Soltex Corporation of Houston, Tex., U.S.A. Synthetic, mechanically expandable graphite is sold by numerous entities, including Timcal of Westlake, Ohio, U.S.A., while natural graphite is available from numerous entities, including Superior Graphite of Chicago, Ill., U.S.A.

Ultimately, each of these aforementioned carbon categories possessed an agreed upon set of the physical characteristics observed after the manufacturing process, including but not limited to dimensions (size, length, diameter, aspect ratio, etc.), morphology, density, particle size, particle size distribution and surface area of the particles/powder, crystalline structure and carbon content/impurities (including but not limited to active functional groups, ash, sulfur, etc.). Conventionally speaking, these parameters were identified as significant because it was believed these physical characteristics determined how the carbon(s) interact with other components in the electrode formulation (e.g., active materials, surfactants, rheology or other additives, etc.). Furthermore, these specific physical characteristics often dictated the classification of the carbon (e.g., carbon black vs. acetylene black) without regard for the original source of the elemental carbon itself.

For the sake of clarity and without intending to exclude other known methods of measurement, the following examples indicate ways in which these physical characteristics may be measured:

Purity by ash content, moisture or carbon content;
Crystalline structure by x-ray diffraction;
Real density (e.g., xylene density, helium density, etc.);
Particle size distribution by laser diffraction, air classification, sieving, tap density or oil absorption;
Porosity/texture by gas adsorption, BET specific surface area, microscopy or mercury porosimetry; and
Surface morphology by gas adsorption, Raman spectrometry or active surface area measurements.
With respect to qualitative and quantitative aspects of functional groups present in active carbons, Boehm titration, thermal gravity analysis, Fourier transform infrared spectroscopy, x-ray photoelectron spectroscopy, temperature-programmed thermodesorption or secondary mass spectrometry.

Any of the foregoing methods, including combinations of several of these methods/characteristics, have been used to define a particular carbon according to the categories noted above. Further, it may be possible to characterize an unknown carbon by comparing any of the foregoing against corresponding measurements from a known source or sources so as to establish the likely provenance of that unknown carbon.

A separate system of classifying carbons is to distinguish between active (or activated) carbon, "soft" carbon and "hard" carbon. Rather than relying on the conventional definitions provided above for carbon black, acetylene black and graphite (as commonly seen in past publications describing batteries), active carbons are any carbon-containing material with high-surface area (i.e., 450 to 1,000 or more m$^2$/g) and high porosity with well-defined pore structure (i.e., the pore distribution possesses a relatively narrow range of diameters) produced by thermal activation and/or chemical activation.

Soft carbons are organic materials that have been carbonized by heat treatment in an inert atmosphere. The resulting graphitized carbons have anisotropic properties and possess low surface area and low porosity.

Hard carbons result from organic materials that have been subjected to heat treatment but do not develop any significant degree of crystalline/three-dimensional lattice structure and, instead, have isotropic bulk properties and higher surface area (in comparison to soft carbons) and high pore volume within a microporous network.

In order to better distinguish between activated carbons and hard carbons in this paradigm, it is possible to think of activated carbons as having a deliberate alteration to their surface area after the carbon has been formed. In contrast, hard carbons are formed with their inherent surface characteristics, so that no subsequent surface treatments are performed, needed or desired.

Some publications have classified carbon powders appropriate for use in zinc-air cells based upon their intended use within the cell. For example, col. 5, line 36 to col. 6, line 3 of U.S. Pat. No. 9,136,540 (the '540 patent) distinguishes carbon on the basis of whether is electrically conductive or catalytically active, although (per the disclosure of this patent) these distinctions are not meant to limit the utility of the carbon at issue. Graphite and carbon black are exemplified as possible electrically conductive carbon powders, while only active carbon is flagged as being catalytically active. Wide ranges (10%-90%) of catalytic carbons are described as comprising the mass of the air electrode. And the majority of the powders should have a small particle size (<325 mesh or <44 micrometers), with all powders in the cell being porous and having a total BET surface area between 200 and 2000 m²/g. Notably, the activated carbons are described as having a narrow range of BET surface area between 900 and 1200 m²/g. The activated carbon, in combination with graphite, is described as providing a carbon support for crystalline or amorphous manganese oxide catalyst. Carbon black is provided to wet proof and to impart electrical conductivity to the air electrode.

Owing to challenges in mixing different carbons and/or maintaining electrical conductivity between them, designers of conventional zinc-air cells—and especially miniature zinc-air cells—usually relied on a single carbon in the air electrode formulation. That carbon must provide: conductivity, oxygen absorption, oxygen reduction, balance hydrophilic and hydrophobic properties, and balance macro and micro pore structure for the three phase reaction process. However, many of these characteristics are inter-related, if not competing and contradictory. Consequently, except for the '540 patent, most publications indicate the use of a single carbon is preferred to simplify the manufacturing process and to minimize the risk of unwanted, deleterious interactions between multiple carbons and/or between the carbons and other cell components.

The inventors have now found that carbons can be categorized based upon the source of the carbon material itself. That is, the inherent performance characteristics of carbons can be differentiated—and ultimately exploited—based on the origin of the carbon without defining the carbon at issue by a set of pre-defined physical characteristics. Indeed, past attempts to characterize carbons solely on the basis of physical attributes, such as BET surface area and the like, do not adequately reflect the potential interactions and impact of impurities and structural features inherent to how that particular carbon was formed. Further, by mixing different types of carbons from different sources, it is possible to optimize the inherent advantages of the individual carbons, especially in view of the additional cell design features disclosed herein, in order to realize a synergistic effect.

A wide array of publications, including the '540 patent, recognized a particular grade of activated carbon, Type PWA carbon sold by Calgon Corporation of Pittsburgh, Pa., as the most preferred (and usually only) carbon for use in air electrodes. A single publication, paragraph of United States patent publication no. 2008/0155813 (the '813 publication), further identified PWA carbon as an active carbon based on a coal source. Nevertheless, the '813 publication—like the a significant number of patents reviewed by the inventors— names only one carbon as being appropriate or preferred, and nothing in this publication or any of the others reviewed by the inventors suggests alternative, source-based identification of carbons.

Consistent with the foregoing, the inventors classify one type of carbon useful in their invention as coal-based carbon. Insofar as coal is formed according to geological processes and are typically extracted from the ground, coal-based carbons are relatively well known and understood as a specific type of carbons. As evidenced by the publication in the preceding paragraph, coal carbons may be treated so as to also be classified as active carbons.

Additionally, the inventors identified plant/lignin-based carbons as being useful for their invention. Such plant/lignin-based carbons are non-fossilized materials derived from recently harvested vascular plants, algae and similar organisms. One example of such a carbon is sold as Darco G60 (CAS Number 7440-44-0) by Norit Americas, Inc., which is now owned and operated by Cabot Corporation based in Boston, Mass.

Finally, polymer-based carbons represent a third distinct group of carbons. These carbon products are synthesized in a controlled environment and usually display extremely high purity with distinct, tailored characteristics. Indeed, because polymer-based carbons provide an opportunity to selectively engineer desired properties, polymer carbons are particularly well-suited to supplement traits that available coal and/or plant/lignin based carbons may lack. Companies such as EnerG2 in Seattle, Wash. sell such products as the M2-series of carbon additives.

In one embodiment, when carbon from all three sources— coal, plant/lignin and polymer—are mixed and utilized in the air electrode, the overall performance electrode can be better controlled and improved. A 1:1:1 (by weight) mixture of carbons provides benefits, although further optimization is possible, and potentially even preferred, depending upon the precise nature of the carbons and rate capability and capacity requirements of the battery. By way of further example, any combination based on whole integers within the stated ranges are possible according to the invention, so long as each component comprises at least 10 wt. % and no more than 80 wt. %. When A represents coal-based carbon, B represents lignin-based carbon and C represents polymer-based carbon, the relative amounts of conductor by weight may be expressed as A:B:C and A+B+C≤100, with A=10 to 80, B=10 to 80 and C=10 to 80 (note that, when A+B+C=100, A, B and C may be treated as weight percentages, wt. %). More specifically, the following criteria are even more preferred: 10≤A≤50, 10≤B≤20 and C=10. Nevertheless, other combinations are possible. The resulting formulation helps to desensitize the air electrode, with each carbon contributing the total electrode performance.

Three exemplary carbons from different sources, including a selection of salient physical properties, are shown in Table 1 below. These properties may apply to all embodiments of the invention disclosed herein.

TABLE 1

Exemplary ranges of functionality, acidity/basicity, pH, Fe, particle size, surface area, porosity, density for source comparison of preferred carbons.

| Source | Carboxylic ueq/g | Lactonic ueq/g | Phenolic ueq/g | Total Acid ueq/g | Total Base ueq/g | pH n/a | Fe Add Sol ppm | Fe KOH sol ppm | d50 Micrometers | BET m²/g | Micropore cm³/g | Density g/cm³ |
|---|---|---|---|---|---|---|---|---|---|---|---|---|
| PWA - Coal (A) | 61-88 | 36-57 | 85-139 | 183-284 | 278-342 | 6.0 | 586 | 14 | 25 | 918-921 | 0.24-0.27 | 2.292 |
| Darco G6 - Lignin (B) | 39-54 | 20-22 | 65-84 | 126-157 | 298-380 | 6.6 | 193 | 7 | 23 | 803-822 | 0.22-0.24 | 2.202 |
| EnerG2 M2 - Polymer (C) | <1 | 22-26 | 128-130 | 133-140 | 235-353 | 6.7 | 4 | 0 | 50 | 1466-1728 | 0.47-0.48 | 2.486 |

In other embodiments, a hard carbon with very low, and more preferably essentially no, carboxylic functional groups is combined with at least one other carbon, preferably an activated carbon, and more preferably with two carbons including at least one activated carbon. The other carbon(s) have carboxylic functionality and may also include lactonic and/or phenolic groups. The "very low" carboxylic functionality can be established comparatively, with a hard carbon having at least an order of magnitude lower amounts of carboxylic groups in comparison to the activated carbon(s) provided to the mix. Provided the hard carbon has no to very low carboxylic functionality, the total acidity of the hard carbon may still be similar to that of the other carbons. In total, the final mixture of carbons should exceed 250 ueq/g in total acidity. As an alternative measure, the pH of the carbon components could serve as relative measure of their functionality, although such measurements may be more sensitive to variations based upon the measurement technique. Additional characteristics, including those identified in table 1, may be useful in distinguishing between the carbon sources according to certain embodiments of the invention.

The BET surface area of the hard carbon in these embodiments is in excess of 1400 square meters per gram, and more preferably at least 1500 square meters per gram. The other carbon or carbons have a BET surface area and density that are individually less than that of the hard carbon, but in all cases, all of the carbons in this embodiment possesses a BET surface area greater than 500 square meters per gram and, more preferably, greater than 800 square meters per gram. The total BET surface area of the mixture should exceed 1000 square meters per gram in some preferred embodiments.

Similarly, the other carbon(s) also have a micropore volume that is less than the hard carbon, with the other carbons all less than one third and more preferably less than one half the micropore volume of the hard carbon. Preferably, the total micropore volume for the mixture is between 0.20 and 0.35 $cm^3/g$, with a more preferred range between 0.25 and 0.30 $cm^3/g$.

The ratio of carbons and their associated properties relative to micropores, macro electrode pores, oxygen absorption and oxygen reduction as well as the balance of hydrophilic and hydrophobicity can be utilized to define a cell's open circuit voltage (OCV). OCV is a significant cell characteristic for miniature zinc-air batteries insofar as lower OCV typically translates into increased air up time (i.e., the amount of time it takes to produce useful voltage after introducing air to the air electrode), and it should be understood that (unless noted to the contrary) such measurements are taken when the cell is on tab or taped and, therefore, not exposed/open to oxygen.

Yet another embodiment contemplates determining the preferred mixture of carbon based upon a balanced consideration of minimizing air-up time and maximizing cell performance characteristics, particularly with respect to OCV and on low and high rate continuous tests, as well as the wireless test (an intermittent service test). As above, PWA and Darco G60 can be classified as activated carbons of coal and plant/lignin origin (respectively), while M2 is a hard or polymer carbon. With approximately 20 wt. % of the mix dedicated to binder (e.g., Teflon), preferred weight percentages for carbons in that mix range from approximately 40 to 65 wt. % for the coal/active carbon, 0 to 30 wt. % for the plant/active carbon and 3 to 15 wt. % of polymer/hard carbon. These exemplary formulations also contemplate the use of preferred surfactants, additives and the other aspects of the invention disclosed herein.

It also is believed that zinc corrosion influences OCV by consuming oxygen within the semi-sealed air cell, possibly contributing to pneumatic forces that displace air (i.e., cathode active material) with electrolyte. The inventors have now found that a change in the type of carbons used in the air electrode unexpectedly altered this response. Specifically, it is believed that an interaction between the anode and air electrode suggests that the alternative carbons may form a stronger bond with the oxygen, thereby reducing/preventing displacement of that oxygen by electrolyte.

The inventors have also observed that high rate performance zinc-air cell is dictated, at least in part, by failure and/or flooding of the air electrode. On a light drain (such as 9.3 $mA/cm^2$), the end of life for the cell is most often dictated primarily by anode efficiency. However, as the drain rate is increased to higher rates (e.g., 12.0 to 16.0 $mA/cm^2$), the air electrode dominates the cell's end of life performance. In fact, cell testing at 15.4 $mA/cm^2$) continuous drain rates in pure oxygen at slightly positive pressure with minimal air electrode failures verified that oxygen starvation is the most likely normal failure mode (note: although tests were conducted in an AZ13-sized miniature air cell, the information and invention(s) described herein should possess broad applicability, especially in all standard miniature air cell sizes). Therefore, in addition to selection of compatible carbon blends, other improvements further contributed to the holistic cell design and improvements delivered by certain embodiments of the invention: pattern lamination to improve the performance of the control air electrode, additives to further influence hydrophobic properties in the air electrode formulation and high shear mixing of the air electrode mix to induce particulate coating and/or improve its rate performance.

First, the catalyst (or "active") layer of the electrode should be laminated to barrier membranes on either side. These membranes help to control gas and liquid ingress and egress to the electrode. On the external facing side, a hydrophobic membrane such as polytetrafluoroethylene or PTFE (such as Teflon® sold by DuPont in Wilmington, Del.) is laminated to control gas ingress and egress within the cell. On the internal facing side, a separator and possibly other layers, preferably engineered to have a desired level of hydrophilicity to assist in drawing necessary reactants to the electrode, are typically laminated. The process of laminating these layers may take place over several different steps, and it is usually subsequent to the extrusion or formation of the catalyst layer itself (which may also be pressed, embedded or laminated to a porous current collector or otherwise extruded from a mixture of catalyst, carbon and binder). A failure to adequately bond either membrane to the electrode structure can result in a gap that permits moisture and/or electrolyte to collect, thereby limiting oxygen supply based on the oxygen solubility within the liquid boundary region created between the membrane and the electrode structure itself.

The inventors have discovered certain advantages by employing textured rollers during the lamination process. The lamination process is believed to further influence the pore structure of the air diffusion membrane layer. Because high rate performance is limited and controlled by the availability of oxygen during discharge, the use of a pattern roll to form the membrane ensures that the membrane won't limit the oxygen supply. PTFE compression during lamination was varied, but all regions were compressed through the use an "anilox" roll with regions of higher and lesser compression. In particular, anilox rollers have dimples, indentations or other textured features that result in a consistent, but not smooth, surface. Such rollers employed on membranes on the internal, external or both sides of the electrode.

It should be understood that the compressive force and pattern must still remain consistent. That is, an anilox roll may be employed in combination with a smooth backing roller, but the resulting process is consistently delivered (e.g., through constant force applied along the length of each roller) during the entire lamination process. Further, even though the ultimate compression force will vary depending upon the roller, it is important to note that the entirety of the electrode surface is compressed at some level. Ideally, some regions will experience relatively high compression in comparison to the remaining regions having only moderate compression (i.e., about 50% in comparison to the "high" compression region). Regions of non-compression (i.e., 0%) are not preferred.

Figure 3:
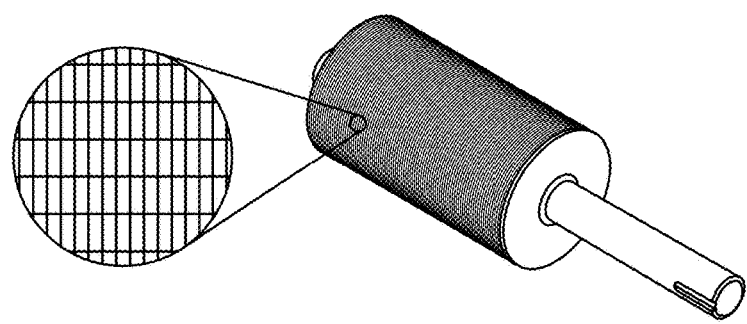
FIG. 3 illustrates a type of "anilox" roller that may be useful in laminating certain embodiments of the air electrode associated with the invention, with an exploded view to depict the uniform texture of the roll, with light areas in the exploded view showing elevated portions in comparison to the dark areas in that view.

FIG. 3 shows an anilox roller in which ridges and troughs are laser etched across the surface of the roller in order to create the preferred profiles of this invention, although it will be understood that other roller configurations may be employed. For example, dimples, indentations or other means of creating uniform "cells" (i.e., patterns with varied depths) may be employed. Usually, the cells are quantified on a per linear inch basis on the roller. A preferred number of cells on a roller of the present invention is 120 lines per inch, with additional preferred ranges anywhere between 100 and 140 lines per inch. The depth of the cells is ideally between 10 and 100 micrometers, with any whole integer between 20-60 micrometers being preferred embodiments.

Figure 2:
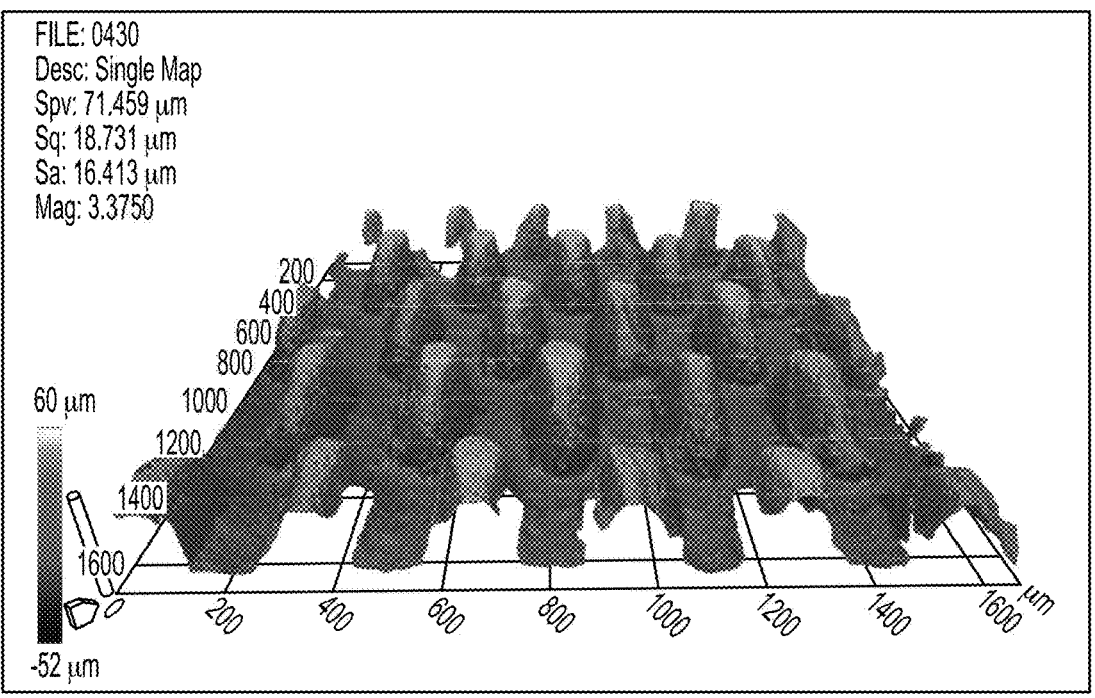
FIG. 2 depicts a three dimensional image of the profile of the air electrode surface according to certain embodiments of the invention.
Figure 2:
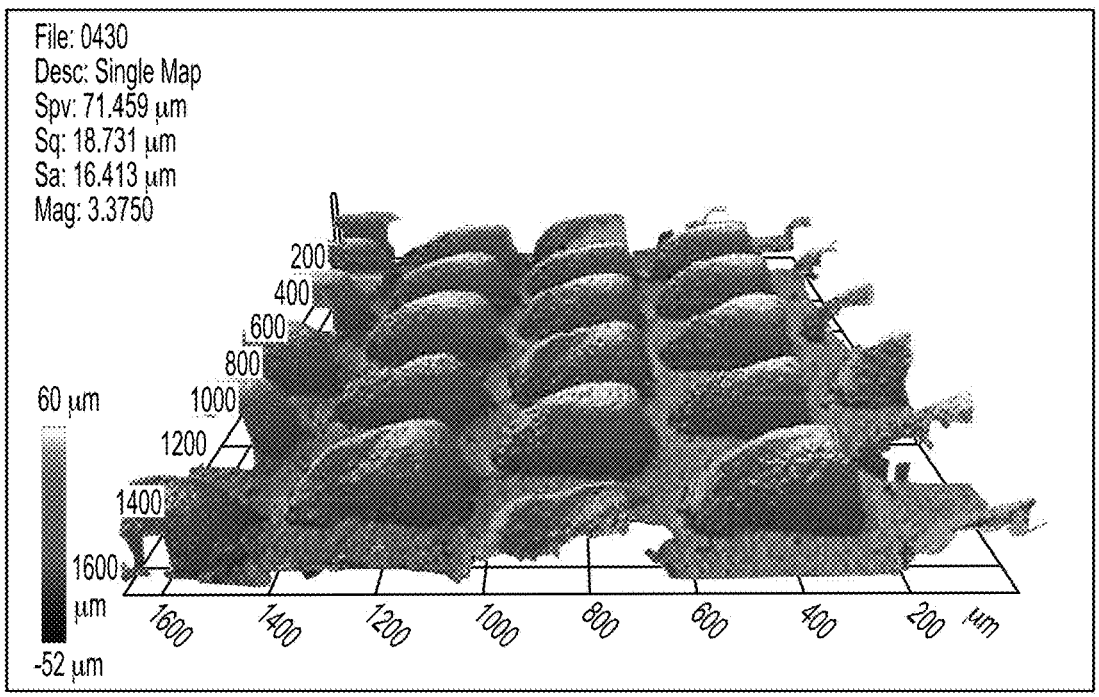

When delivered appropriately, the resulting surface of the electrode contains a uniform series of protrusions along its length. Even if compressive force is applied consistently, the edges of the resulting laminate may still have variations in the height of the protrusions in comparison to the central portions, but the ultimate goal is to achieve as much uniformity as is possible. Three dimensional imaging may be used to profile the resulting laminate and verify the formation of protrusions. FIG. 2 shows profiles of the laminated electrode surface according to certain embodiments of the invention. It should be noted that the observed protrusions and/or indentations via imaging may not exactly correspond to the original roller and, instead, may be uniformly smaller so as to reflect additional processing, smoothing, etching or compression exerted upon the laminated electrode. Thus, the difference protrusions and indentations and the base material (i.e., the gradient) observed via imaging may be between 10 and 100 micrometers, with any whole integer between 20-60 micrometers and 30-40 micrometers being preferred embodiments.

Whether by way of after-the-fact imaging the manufactured air electrode or by through the use of an anilox-style roller during manufacturing, the preferred surface/texture of the air electrode corresponds to the protrusions and/or indentations on the electrode surface interface, as well as patterns in the roller(s) itself. Thus, the height of the protrusions and/or depth of indentations will correlate with the laminating rollers, and conclusions can be drawn as to the roller pattern by way of observing the air electrode and vice versa.

Laminating compression should be exerted in an amount that is proportionate to the materials used in the air electrode. The relative amount of binder, the desired mechanical properties of the electrode and the type of roller(s) used will all influence the precise amount, as will the initial thickness of the membrane and its desired, final porosity. Consequently, the precise lamination force may vary. However, in all cases, the force will sufficient to compress the membrane to adhere it to the electrode while simultaneously creating the textured pattern described above.

In some embodiments of the invention, the initial thickness of the diffusion membrane, the point of 100% compression (i.e., 0% porosity) of the membrane and thickness gradient (i.e., the difference between the depth of the lowest indentation and the highest protrusion in the final, laminated membrane) cooperate to inform the laminating conditions. For example, consider a membrane material having a 400 micrometer initial thickness with a nominal porosity of 30-40% and a 240 micrometers thickness at 100% compression/0% porosity. If the desired gradient is 50 microns, the compressive forces must remain within the range that sufficiently laminates the material while also imprinting the gradient but without compressing the material at its maximum of the gradient (i.e., the point of greatest compression, usually the lowest indentation in the pattern) to match or exceed the 100% compression point. Ultimately, any combination of initial and/or desired porosity, initial and/or desired thickness, maximum and/or minimum desired thickness at either or both of the maximum and minimum gradient and the gradient itself can all be used to define the final, preferred laminate.

Given the size and operating parameters of an anilox roll may vary considerably while still creating the desired gradient, it is preferred to express the laminating forces as a function of certain properties of the final, laminated combination. For example, the membrane and electrode should possess sufficient bonding to keep the membrane adhered to the electrode during manufacturing as well as the operation of the final, constructed cell (i.e., without creating gaps that allow for moisture collection as noted above). In addition, the force applied should be sufficient to compress the entire material beyond the minimum gradient (i.e., the point of least compression, usually the highest protrusion in the pattern). Thus, for a 400 micrometer thick material with a 40 micrometer gradient, the force must compress the material in excess of 40 micrometers at the maximum gradient and in excess of 0.1 micrometers at the minimum gradient. Conversely, if that material has a 100% compression/0% porosity threshold of 240 micrometers thick, the applied force cannot compress the material more than 160 micrometers at the maximum gradient and 120 micrometers at the minimum gradient. Preferred compression should be centered near the midpoint of the minimum and maximum (using the foregoing values, the midpoint would be 320 micrometers of thickness), with ranges between +/−30%, +/−20% and +/−10% of the midpoint being most preferred.

Second, the use of additives in the air electrode formulation could be leveraged to reduce flooding and improve wet-proofing. For example, hydrophobic fumed silica (such as Cab-O-Sil TS-720 made by Cabot Corporation of Boston, Mass.) may be an effective means to further improve the robustness of the electrode to flooding. Additional hydrophobic coatings, compatible with the components and design intents described herein, could be applied after formation (and/or lamination) of the air electrode. For example, hydrophobic coatings could be selectively applied, partially or completely, on the air side of the electrode, on the anode/separator side of the electrode, and/or as a spray coating of the air electrode mix prior to extrusion.

The wet proofing intent, achieved by particulate coating, is different than that associated with emulsion coating in that any wet proofing is associated with particles versus wet proofing by fibers or fibrillation, as described below. Relative to air electrodes, one can envision bonding nano catalyst onto activated carbon and or bonding nano particles of a wet proofing polymer such as Teflon onto the surface of activated carbon. In this approach to wet proofing, one starts with a nano size powder of Teflon agglomerates, which through the use of high mechanical mixing or shear are broken down to the primary particles which are than attracted to the carbon surface through weak Van der Waals forces. This process can be described by a number of terms including: dry coating, ordered mixing and structured mixing.

Third, when air electrodes have been extensively worked in the dry powder through high shear mixing, high rate performance (15.3 mA/cm$^2$ continuous) is greatly improved. Specifically, high rate performance is limited and controlled by the availability of oxygen during discharge, so improved wet proofing ensures that the available oxygen won't be limited by solubility in electrolyte. A totally dry powder mix process for producing an air electrode offers advantages in homogeneity of components and the elimination of detrimental surfactants. When PTFE and/or other binders are properly distributed within the binder/carbon/catalyst matrix and then effectively fibrillated by high shear mixing, the performance of the air electrode is greatly improved.

More specifically, the use of two blending motions is preferred: a low speed low energy plow which blends materials and presents them to a high speed chopper, with the chopper providing high speed shear for fibrillation. Alternative methods of creating this two stage mixing are possible, including but not limited to mixing within a rotating barrel with one or more blades moving in coordination with the barrel movement resulting in the desired low speed plowing and high speed chopping that for the desired fibrillation. On useful measure in this regard is the tip speed of the high shear mixing implement. In particular, a tip speed of at least 25 m/s is preferred, with a more preferred target of 26.5 m/s. The low shear implement should be sufficient to ensure that material is fed into the high shear mixing operation in consistent manner, and preferably so as to replenish the material entering the high shear zone. Ultimately, the time, speed and volume of the mixing chamber all influence the precise conditions for optimal mixing.

Figure 4:
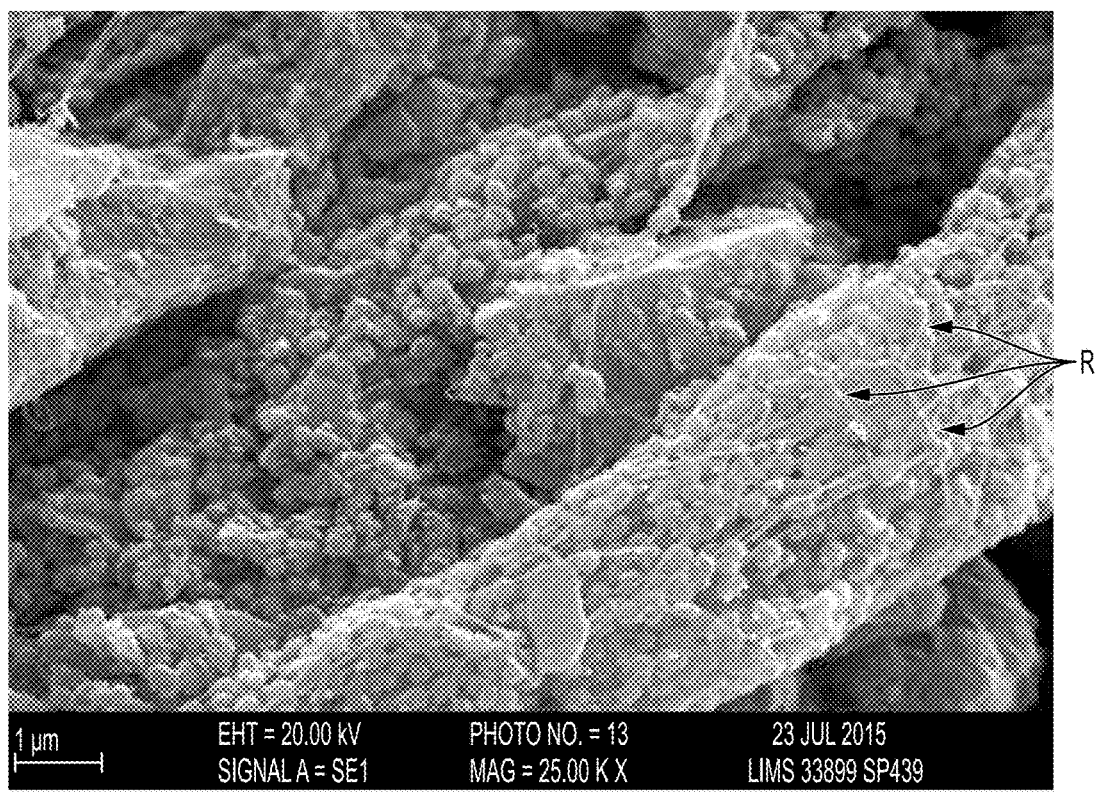
FIG. 4 is a scanning electron microscopic image of an air electrode formulation that has been mixed at high shear to induce fibrillation, including particulate coating and fiber or macro-rope formation, according to certain embodiments of the inventions.

Additional high shear working of the mix can result in fiber formation from PTFE aggregates not broken down to individual nano particles. In fact, dry powder pre-mixing with high shear via a high speed impeller may be sufficient to induce fibrillation. Fiber formation or roping (indicated by reference element R) can be confirmed via SEM at 25,000 X as seen in FIG. 4.

Ultimately, mixing according to certain embodiments of the invention creates particulate coating, which the inventors refer to a type of "dry particle coating." In practice, particulate coating and dry particle coating contemplate the minimization—if not elimination—of surfactants while dispersing the dry mixture components sufficiently to create the desired wet-proofing properties in the resultant mixture. For example, nano-teflon species adheres to portions of the carbon surface to while still maintaining sufficient exposed surface area on the carbon to allow for its desired reactive properties. Such dry particle coating is characterized, in its final form, by the formation of fibers and particles and, in some instances, "ropes" (i.e., thicker fibers). The combination of fibers, particles and/or ropes all cooperate to impart the necessary wet-proofing and reactivity among the dry mixed components.

Selection of specific grades of PTFE may influence the ultimate size of the fibers. For example, a mixture of powders based on PTFE grade sold by DuPont as 6C and grade Fluo X-1406 sold by Micro Powder Inc, of Tarrytown, N.Y. form an effective and consistent wet proofed electrode based on a combination of particulate coating, near nano fiber formation and macro ropes. 6C powder provides the particulate coating and fiber formation while X1406 provides larger fibers or ropes which improve electrode integrity. In this embodiment, the particulate coating PTFE is provided at 30-50 times the weight percentage amount of the fibers and macro-rope producing PTFE. In one embodiment, the particulate coating powder is provided at 20 weight percent of the formulation and the macro-rope PTFE is limited to 0.5 weight percent. Other preferred ranges for the weight percentages could be plus or minus 25% of the weight percentages stated in the preceding sentence.

Taken together, a preferred air electrode can be formed from a powder comprising 50 weight percent coal-based carbon, 20 weight percent plant/lignin based carbon, 10 weight percent polymer based carbon, 19 weight percent particulate coating PTFE, 0.5 weight percent macro-rope PTFE and 0.5 weight percent hydrophobic fumed silica. The powder is mixed at high shear to induce fibrillation. Carbons are selected on precursors of coal/lignin/polymer and have been pretreated at a 5 weight percent $MnO_2$ catalyst level.

The holistic effects of the air electrode can be further amplified through the use of a preferred anode formulation consisting of: 99.29 wt. % zinc alloyed with bismuth, indium and aluminum, 0.25 wt. % binder, 0.125 wt. % functionalized barium sulfate, 0.25 wt. % zinc oxide, 0.05 wt. % $Bi_2O_3$ (preferably nano-sized), and 0.04 wt. % indium hydroixde. The electrolyte is 33 wt. % KOH with a fluorosurfactant added at the equivalent of 40 ppm of the zinc weight. This preferred anode is in addition to the anode formulations discussed above, and other embodiments of the holistic cell design and air electrode may still realize benefits even when using more conventional anode formulations.

EXAMPLE

Three carbons were selected according to their source, as described above. A series of sample cells were made while varying the amounts of each carbon and binder according to the table 2 below.

TABLE 2

Dry coating mixtures for analysis.

| Component 1<br>A: PWA | Component 2<br>B: Darco | Component 3<br>C: M2-23 | Component 4<br>D: 6CX |
|---|---|---|---|
| 0.000 | 0.000 | 85.000 | 15.000 |
| 0.000 | 85.000 | 0.000 | 15.000 |
| 28.333 | 28.333 | 28.333 | 15.000 |
| 41.250 | 0.000 | 41.250 | 17.500 |
| 89.000 | 0.000 | 0.000 | 15.000 |
| 41.250 | 41.250 | 0.000 | 17.500 |
| 13.750 | 53.750 | 13.750 | 18.750 |
| 0.000 | 41.250 | 41.250 | 17.500 |
| 80.000 | 0.000 | 0.000 | 20.000 |
| 0.000 | 80.000 | 0.000 | 20.000 |
| 28.333 | 28.333 | 28.333 | 15.000 |
| 0.000 | 0.000 | 80.000 | 20.000 |

Each of the mixtures was subjected to two stage mixing with a "pre-blend" for 5 minutes at a tumble rate of 20 rpm and an impeller speed of 500 rpm. High shear mixing was induced for 15 minutes at a tumble rate of 30 rpm and an impeller speed of 3350 rpm. All mixing was conducted in a one gallon vessel using a 6 inch impeller. Air electrodes were then manufactured with an anilox lamination roll for moderate to high pore compression. All other cell components and design features for an AZ13 sized cell were held constant.

These air electrodes were then characterized for various performance criteria to identify the optimal formulation. Since the ability to reduce oxygen is directly associated with carbon properties, the rate capability of the cell is an important property and helps to support the data generated for air electrodes on bench top testing shown above. First, the current that the cell can support at 1.1 volt for one minute was measured. Results are shown in the ternary diagrams of FIGS. 5A and 5B. Past work has shown non-anilox electrodes result in a value of about 8 mA on this test, whereas all iterations of the mixtures in the Figure outperform significantly. In fact, it is believed the change to pattern lamination dominates the rate capability, and there appears to be as much of an influence from Teflon content, 15% (FIG. 5A) vs. 20% (FIG. 5B) as there is from the type of carbon on this test.

Additional, more conventional service and performance tests were also performed. Understanding that IEC Standard tests, 3 mA for AZ13 (i.e., 9 mA/cm$^2$) and IEC HR tests are all dominated by the anode performance, these tests focused on the Wireless Service test, 5 mA continuous for AZ13 (i.e., 15.4 mA/cm$^2$) and "air up" time (i.e., the amount of time it takes for oxygen to initially diffuse into the cell to operate under standardized conditions).

Figure 6A:
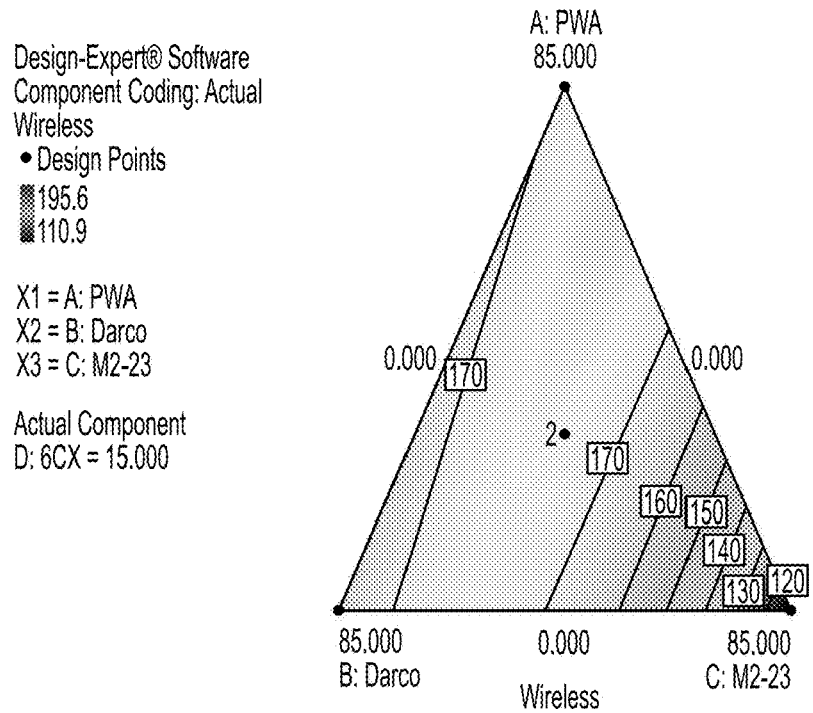
FIG. 6A is a ternary diagram showing performance on the Wireless Service test, for air electrodes having different mixtures of three different carbons, with 15% Teflon.
Figure 7A:
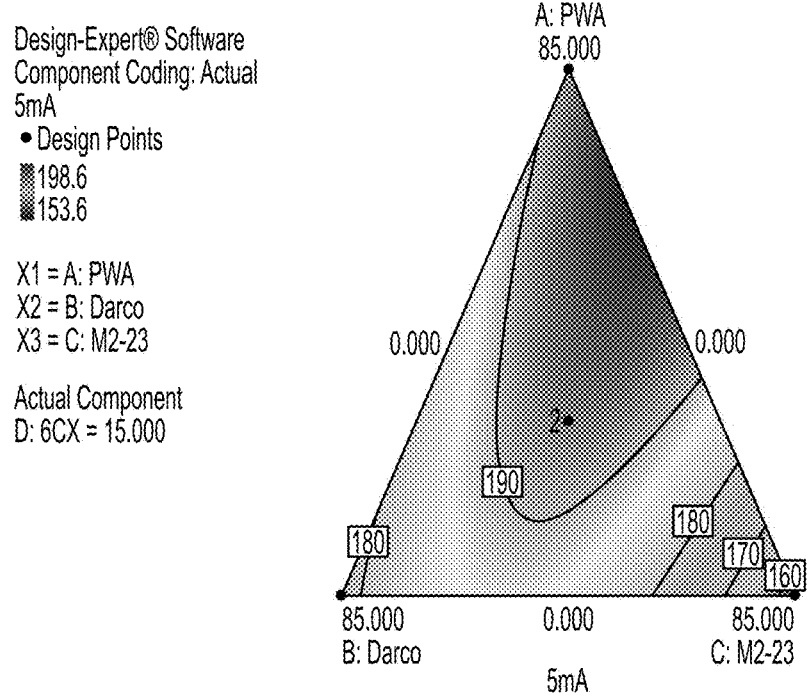
FIG. 7A is a ternary diagram showing performance on the 5 mA continuous test, for air electrodes having different mixtures of three different carbons, with 15% Teflon.
Figure 8A:
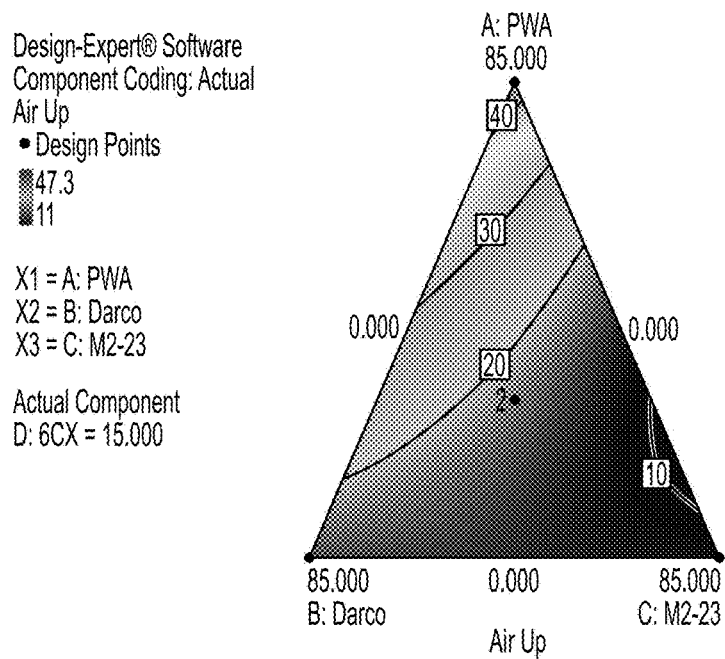
FIG. 8A is a ternary diagram showing "air up" time, for air electrodes having different mixtures of three different carbons, with 15% Teflon.
Figure 9:
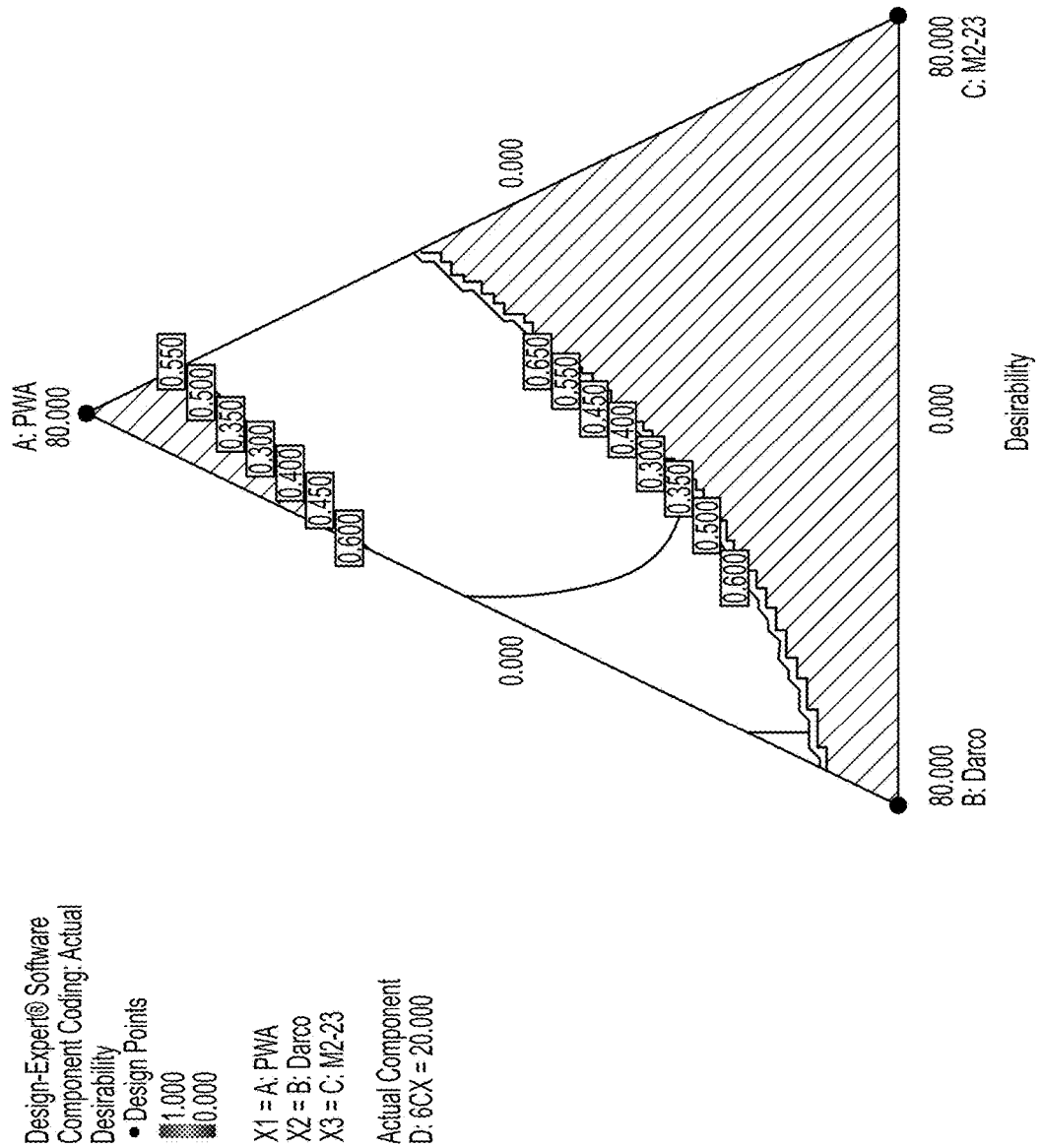
FIG. 9 represents the preferred formulation range.
Figure 1:
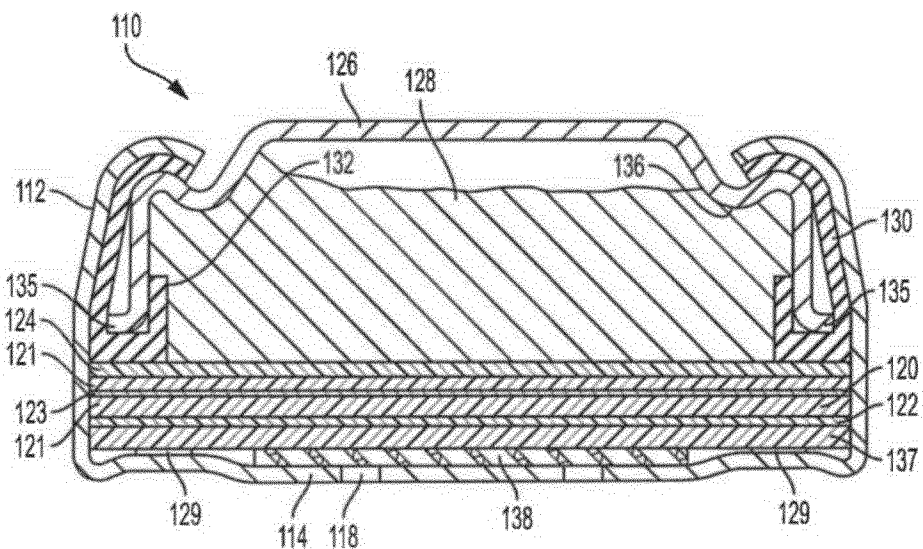
Figure 2:
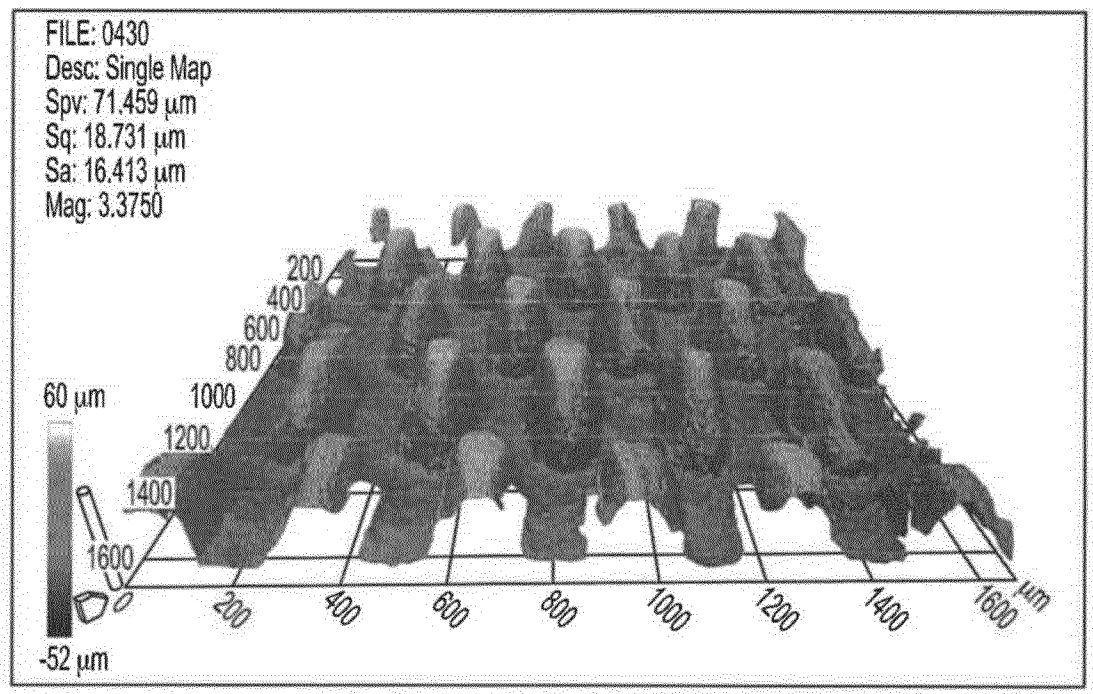
Figure 2:
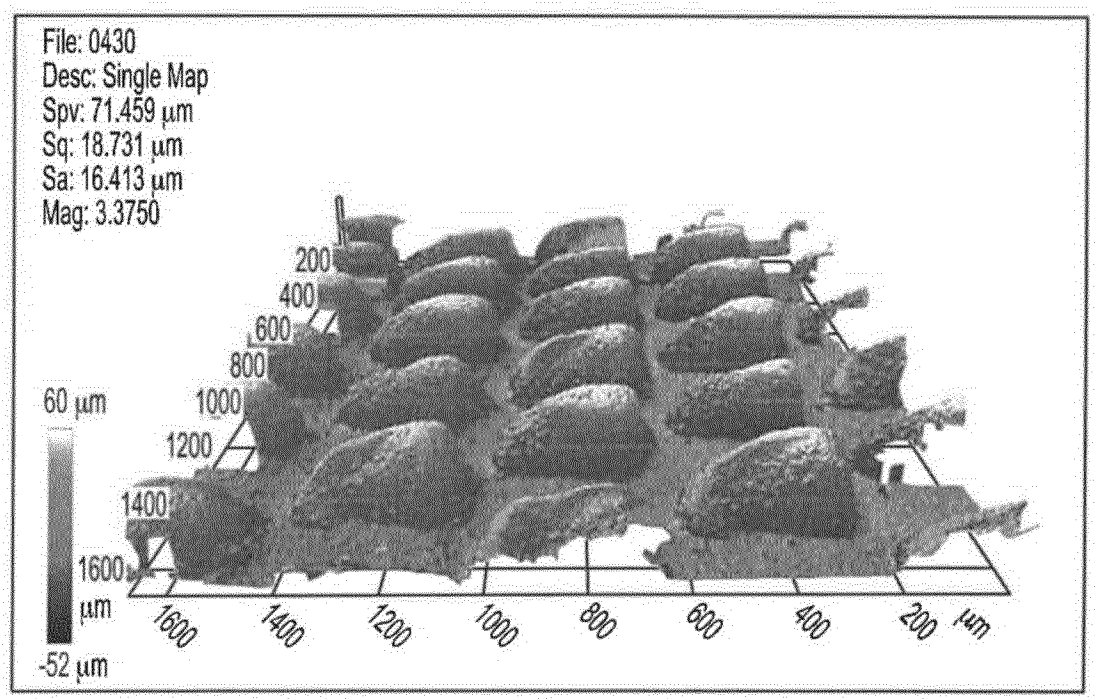
Figure 3:
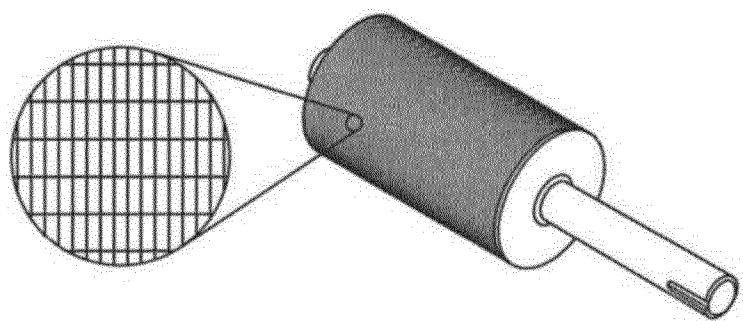
Figure 4:
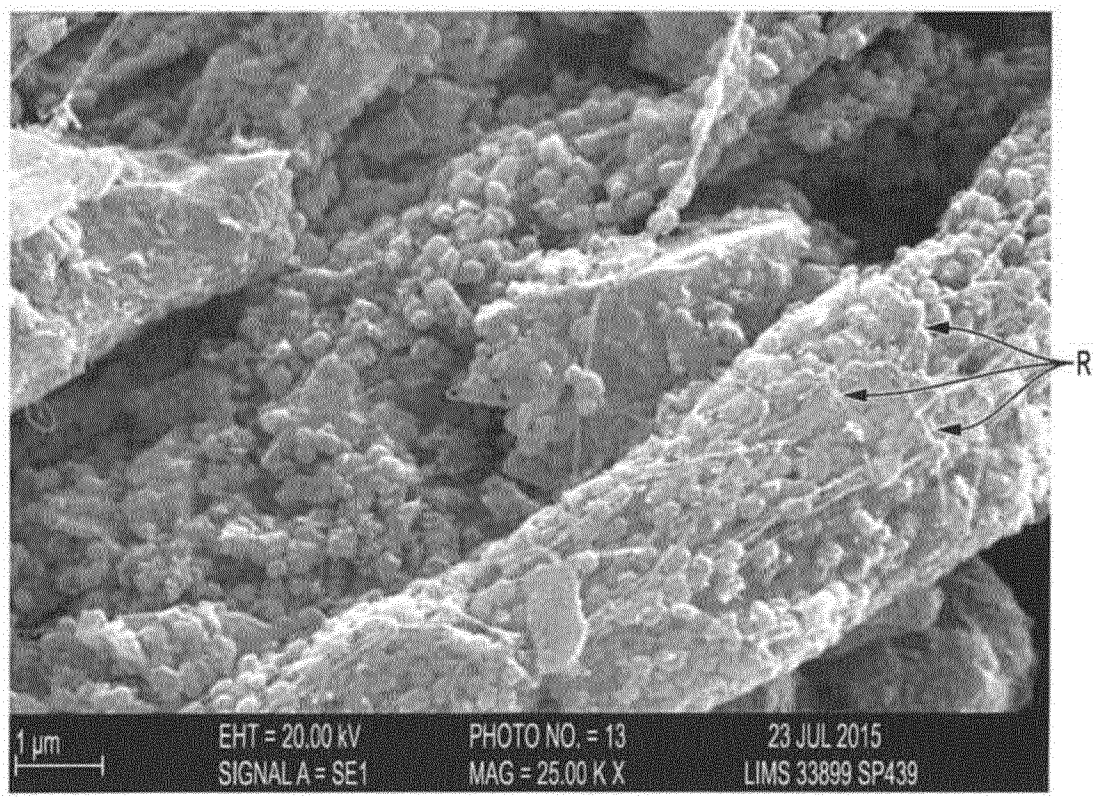
Figure 5A:
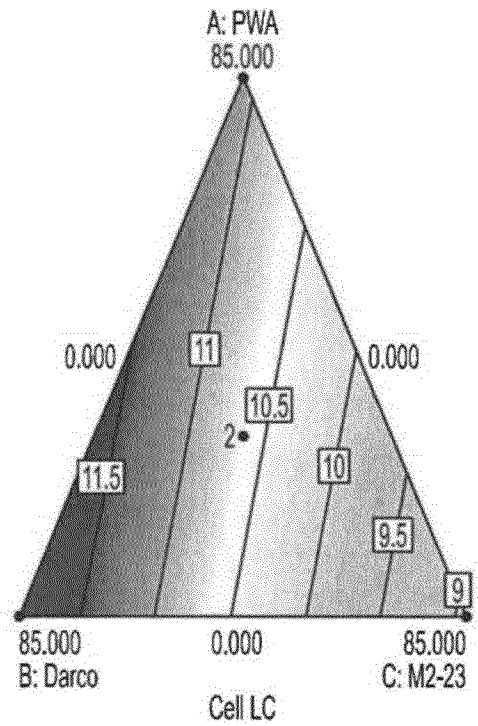
Figure 5B:
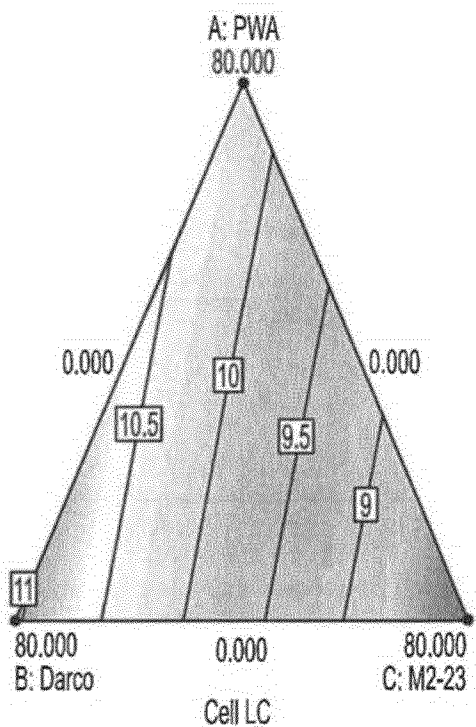
Figure 6A:
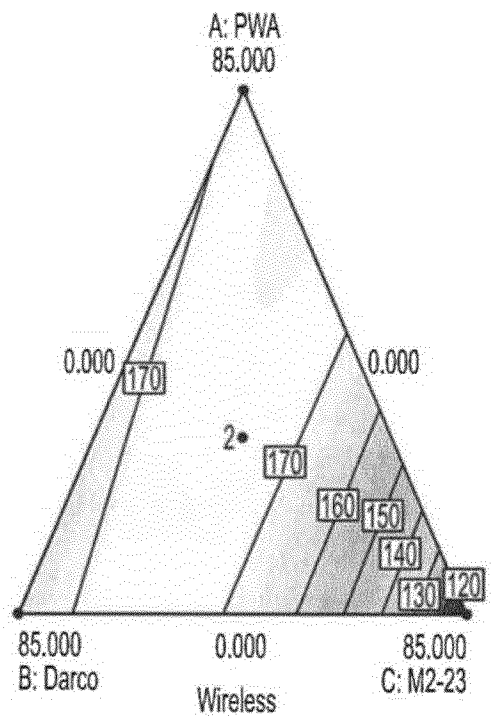
Figure 6B:
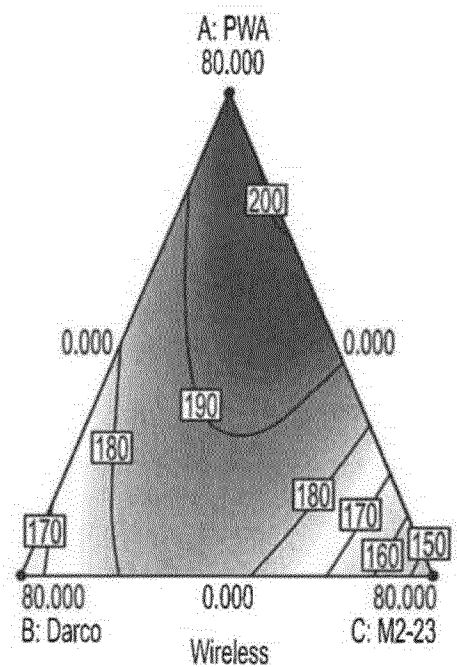
Figure 7A:
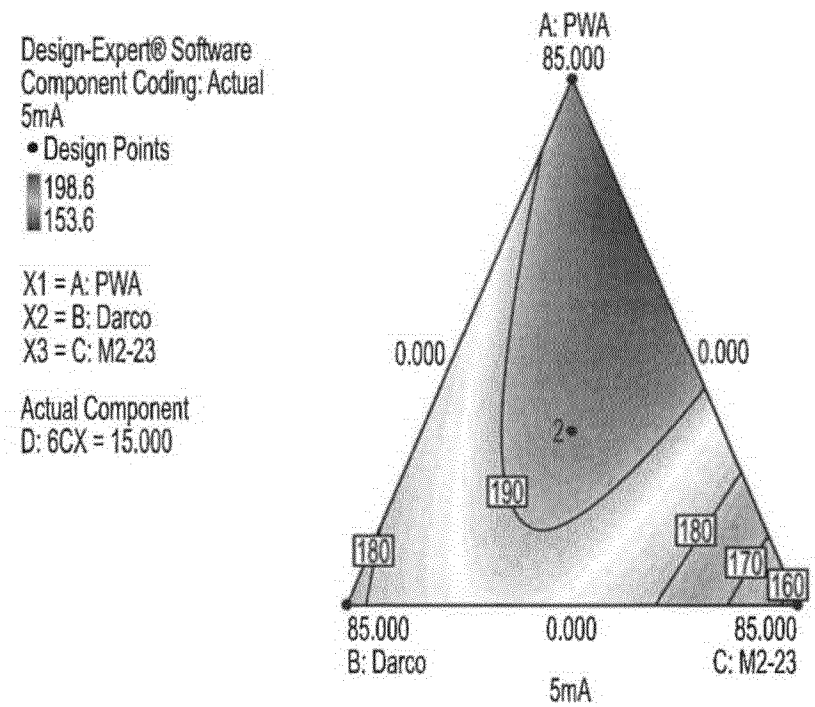
Figure 7B:
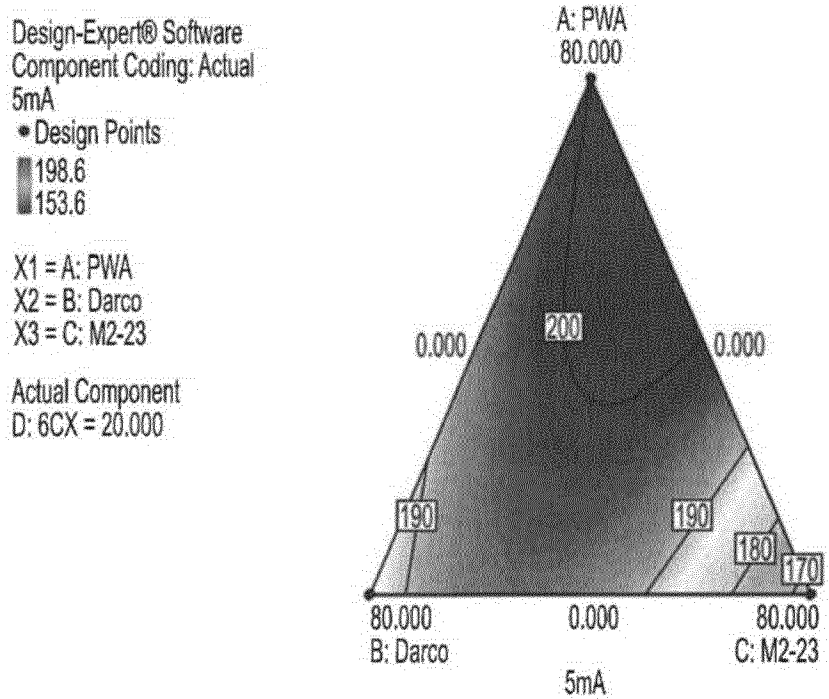
Figure 8A:
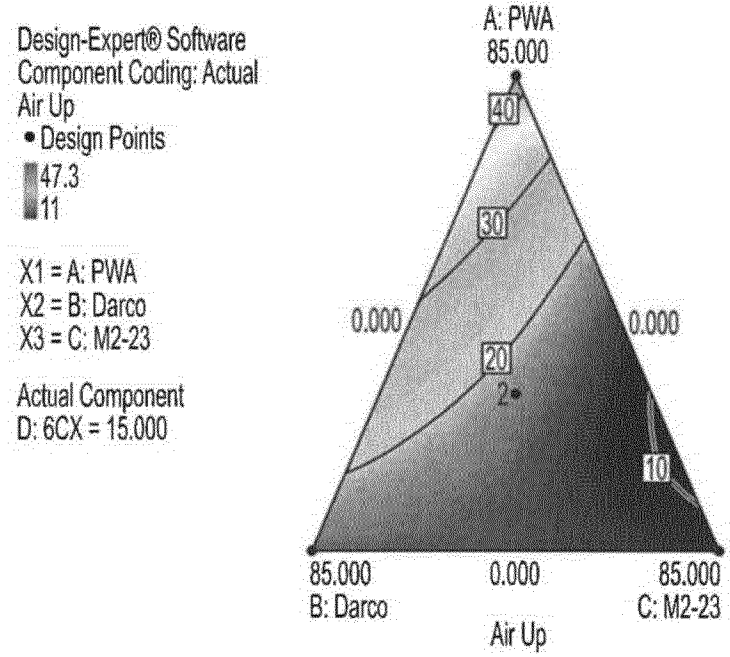
Figure 8B:
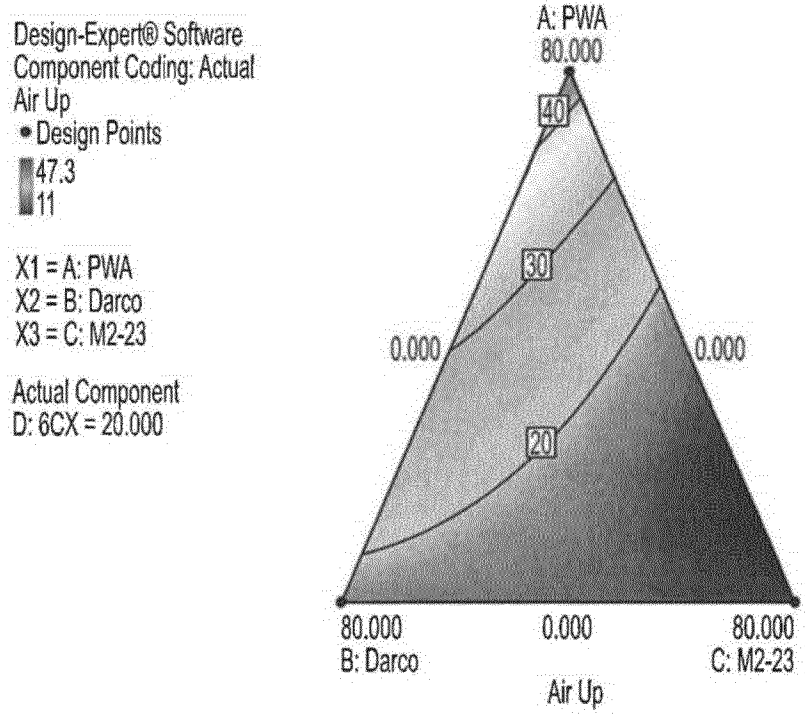
Figure 9:
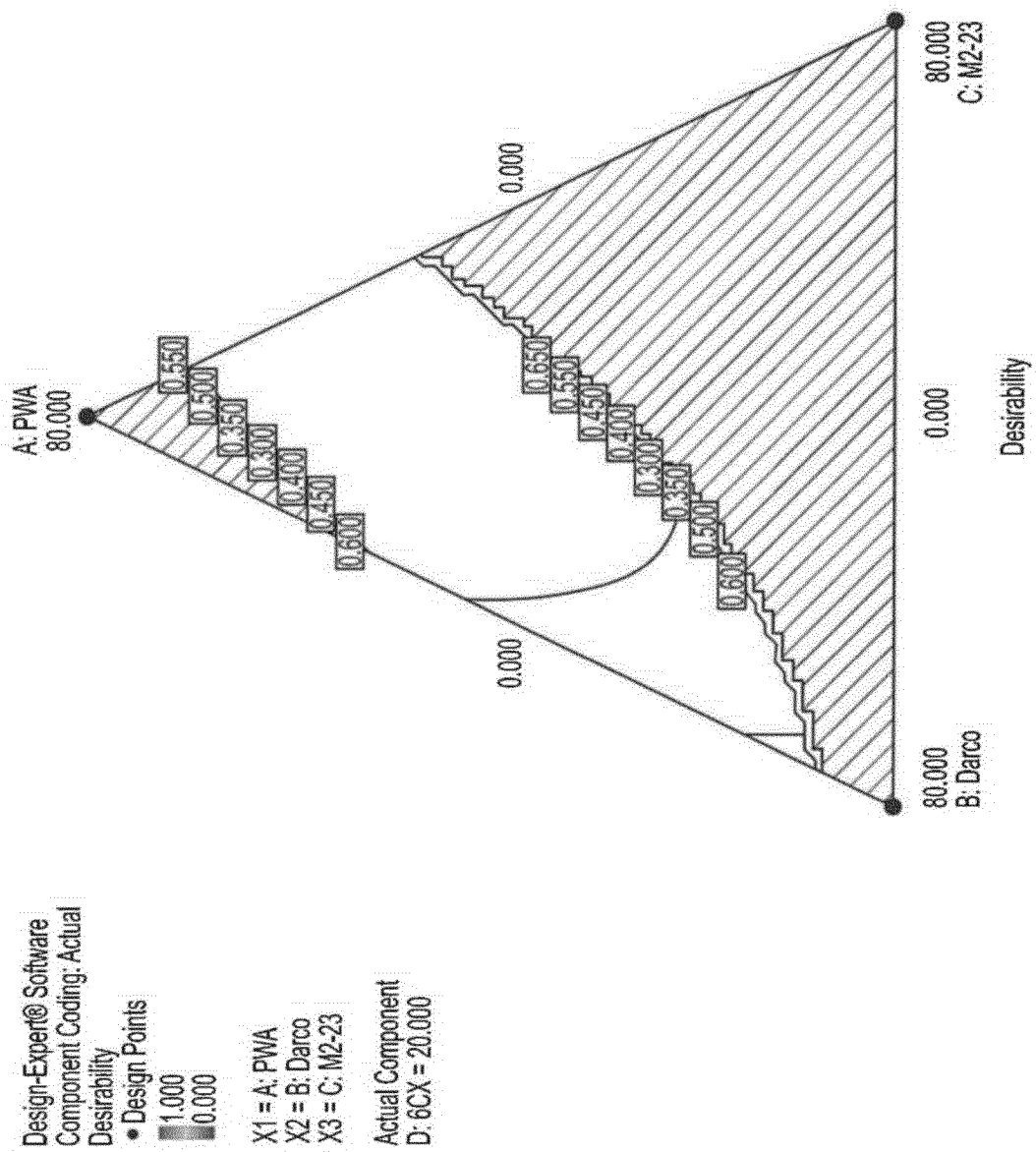

FIGS. 6A (at 15% Teflon) and 6B (at 20% Teflon) show the optimal mixtures for the Wireless test. FIGS. 7A (at 15% Teflon) and 7B (at 20% Teflon) reflect 5 mA continuous. FIGS. 8A (at 15% Teflon) and 8B (at 20% Teflon) reflect air-up time. Based upon the foregoing, the light colored space in FIG. 9 represents the inventors' preferred formulation range. As noted above, all three carbons are preferably included or at least a hard carbon and one active carbon are included, so that the extremes of this graph (or any of the others) should be interpreted accordingly.

For all of the FIGS. 5-9, the amounts of carbon are expressed in weight percentages, and the contour lines along the interior of each compositional triangle represent expected performance at the triangulated mixture represented by that point. To that end, the bottom axis of the triangle represents component A (i.e., PWA carbon, an activated, coal-based carbon), the top right axis represents component B (i.e., Darco G-60 a plant/lignin-based carbon) on a similar scale, and the top left is component C (i.e., M2 carbon, a hard, polymer-based carbon). All three axes contemplate a maximum of 80 wt. % for that component.

The foregoing description identifies various non-limiting embodiments of the invention. Modifications may occur to those skilled in the art and to those who may make and use the invention. The disclosed embodiments are merely for illustrative purposes and not intended to limit the scope of the invention or the subject matter set forth in the claims.

What is claimed is:

1. An electrochemical cell comprising:
   an anode including zinc;
   a laminated air electrode comprising dry components including a manganese dioxide catalyst, a mixture of carbons, and a binder that is both fibrillated and particulate coated to at least a portion of the carbons, and wherein the mixture of carbons includes a hard carbon and at least one activated carbon; and
   an electrolyte including potassium hydroxide.

2. The cell according to claim 1, wherein the anode further comprises at least one selected from: fumed silica, functionalized barium sulfate and a sulfotricarballylate fluorosurfactant.

3. The cell according to claim 1 wherein the laminated air electrode has a consistent pattern of at least one of protrusions and indentations along one surface of the laminated air electrode.

4. The cell according to claim 3 wherein the at least one of protrusions and indentations were created with an anilox roller.

5. A method of manufacturing a miniature zinc-air electrochemical cell, the method comprising:
   selecting a mixture of carbons including a hard carbon and at least one activated carbon;
   subjecting the mixture of carbons to two-stage mixing including high shear in the presence of a manganese dioxide catalyst and a binder that is both fibrillated and particulate coated to at least a portion of the carbons so as to induce the formation of particles and fibers;
   forming an air electrode from the mixture of carbons, binder, and the manganese dioxide catalyst;
   laminating a hydrophobic layer to one side of the air electrode using an anilox roller;
   providing an anode including zinc; and
   providing an electrolyte including potassium hydroxide.

6. The method of claim 5 further comprising introducing fumed silica prior to forming the air electrode.

* * * * *

UNITED STATES PATENT AND TRADEMARK OFFICE
CERTIFICATE OF CORRECTION

PATENT NO. : 10,205,206 B2
APPLICATION NO. : 15/041739
DATED : February 12, 2019
INVENTOR(S) : Marple et al.

It is certified that error appears in the above-identified patent and that said Letters Patent is hereby corrected as shown below:

Please delete Pat. No. 10,205,206 B2 in its entirety and insert Pat. No. 10,205,206 B2 in its entirety as shown on the attached pages.

Signed and Sealed this
Eleventh Day of August, 2020

Andrei Iancu
*Director of the United States Patent and Trademark Office*

(12) United States Patent
Marple et al.

(10) Patent No.: US 10,205,206 B2
(45) Date of Patent: Feb. 12, 2019

(54) ZINC-AIR ELECTROCHEMICAL CELL

(71) Applicant: Energizer Brands, LLC, Saint Louis, MO (US)

(72) Inventors: Jack W. Marple, Avon, OH (US); Thomas J. Sherry, North Olmsted, OH (US)

(73) Assignee: Energizer Brands, LLC, St. Louis, MO (US)

( * ) Notice: Subject to any disclaimer, the term of this patent is extended or adjusted under 35 U.S.C. 154(b) by 185 days.

(21) Appl. No.: 15/041,739

(22) Filed: Feb. 11, 2016

(65) Prior Publication Data
US 2017/0237133 A1   Aug. 17, 2017

Related U.S. Application Data
(63) Continuation-in-part of application No. PCT/US2015/054489, filed on Oct. 7, 2015, and a (Continued)

(51) Int. Cl.
*H01M 12/06* (2006.01)
*H01M 4/62* (2006.01)
*H01M 4/88* (2006.01)

(52) U.S. Cl.
CPC ......... *H01M 12/06* (2013.01); *H01M 4/8875* (2013.01); *H01M 4/8896* (2013.01)

(58) Field of Classification Search
CPC ...... H01M 12/06; H01M 4/8896; H01M 4/88; H01M 4/8652; H01M 4/8657;
(Continued)

(56) References Cited

U.S. PATENT DOCUMENTS

| | | | |
|---|---|---|---|
| 4,195,120 A | 3/1980 | Rossler et al. | |
| 4,777,100 A | 10/1988 | Chalilpoyil et al. | |

(Continued)

FOREIGN PATENT DOCUMENTS

| | | |
|---|---|---|
| AU | 2005225138 A1 | 5/2006 |
| AU | 2004210507 B2 | 10/2009 |

(Continued)

OTHER PUBLICATIONS

BASF, "Kollicoat IR: Polyvinyl alcohol-polyethylene glycol graft copolymer for instant-release coatings and quick-dissolving formulations", *BASF Technical Information*, Feb. 2013, 14 pages, retrieved from <https://www.google.com/?gws_rd=ssl#q=kollicoat+ir+technical+information+basf+2013> on Jan. 14, 2017.
(Continued)

*Primary Examiner* — Sean P Cullen
(74) *Attorney, Agent, or Firm* — Alston & Bird LLP

(57) ABSTRACT

A multi-faceted zinc-air electrochemical cell design holistically leverages interactions between components, especially with respect to conductive carbons from differing sources, lamination and the resulting impact it has on the air electrode's surface and other additives that impact the relative hydrophilicity of the membrane and/or performance of the anode, to improve the overall reliability and performance of the resulting battery.

6 Claims, 8 Drawing Sheets

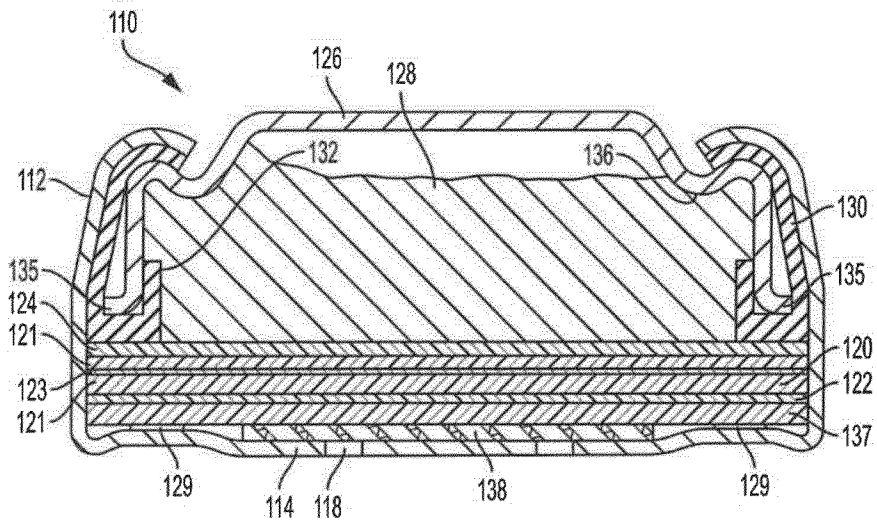

Related U.S. Application Data continuation-in-part of application No. PCT/US2015/057063, filed on Oct. 23, 2015, which is a continuation-in-part of application No. PCT/US2015/054489, filed on Oct. 7, 2015.

(60) Provisional application No. 62/061,348, filed on Oct. 8, 2014, provisional application No. 62/067,756, filed on Oct. 23, 2014.

(58) Field of Classification Search
CPC .... H01M 4/9016; H01M 4/9083; H01M 4/96; H01M 4/38; H01M 6/185; H01M 6/188; H01M 8/1016; H01M 8/1007; H01M 4/9638
USPC .................................. 429/406, 528, 532, 232
See application file for complete search history.

(56) References Cited

U.S. PATENT DOCUMENTS

| | | |
|---|---|---|
| 5,300,394 A | 4/1994 | Miller et al. |
| 5,312,476 A | 5/1994 | Uemura et al. |
| 5,378,562 A | 1/1995 | Passaniti et al. |
| 5,401,590 A | 3/1995 | Chalilpoyil et al. |
| 5,419,977 A * | 5/1995 | Weiss ............... H01M 10/4264 429/303 |
| 5,464,709 A | 11/1995 | Getz et al. |
| 5,677,084 A | 10/1997 | Tsukamoto et al. |
| 6,203,943 B1 | 3/2001 | Bennett et al. |
| 6,551,742 B1 | 4/2003 | Huq et al. |
| 6,602,629 B1 | 8/2003 | Guo et al. |
| 6,780,347 B2 | 8/2004 | Ndzebet |
| 6,872,489 B2 | 3/2005 | Armacanqui et al. |
| 6,939,630 B2 | 9/2005 | Sotomura et al. |
| 6,967,038 B2 | 11/2005 | O'Brien |
| 7,008,723 B2 | 3/2006 | Daniel Ivad et al. |
| 7,208,248 B2 | 4/2007 | Hayashi et al. |
| 7,563,537 B2 | 7/2009 | Pratt et al. |
| 7,615,508 B2 | 11/2009 | Kaplan et al. |
| 7,754,381 B2 | 7/2010 | Fujino et al. |
| 7,993,508 B2 | 8/2011 | Stimits et al. |
| 8,586,244 B2 | 11/2013 | Fensore et al. |
| 8,652,685 B2 | 2/2014 | Guo et al. |
| 8,945,736 B2 | 2/2015 | Uensal et al. |
| 8,999,874 B2 | 4/2015 | Kishimoto et al. |
| 9,136,540 B2 | 9/2015 | Padhi et al. |
| 2004/0229107 A1 | 11/2004 | Smedley |
| 2005/0287438 A1 * | 12/2005 | Bernard ............... H01M 4/624 429/223 |
| 2007/0092429 A1 | 4/2007 | Mao et al. |
| 2007/0154704 A1 | 7/2007 | Debergalis et al. |
| 2007/0160898 A1 | 7/2007 | Takamura et al. |
| 2008/0096074 A1 * | 4/2008 | Wu ................... H01M 2/0222 429/406 |
| 2008/0155813 A1 | 7/2008 | Dopp |
| 2008/0241683 A1 | 10/2008 | Fensore |
| 2009/0320718 A1 | 12/2009 | Hierse et al. |
| 2011/0143253 A1 | 6/2011 | Miyata et al. |
| 2011/0265669 A1 | 11/2011 | Padberg |
| 2012/0111233 A1 | 5/2012 | Hierse et al. |
| 2013/0162216 A1 * | 6/2013 | Zhamu ............... H01G 11/06 320/130 |
| 2015/0244000 A1 | 8/2015 | Ozaki et al. |
| 2016/0226281 A1 * | 8/2016 | Gadkaree ............ H01G 11/06 |

FOREIGN PATENT DOCUMENTS

| | | |
|---|---|---|
| CA | 2216823 A1 | 3/1998 |
| CA | 2716012 A1 | 10/2009 |
| CA | 2321313 C | 12/2009 |
| CA | 2795492 A1 | 10/2011 |
| CA | 2472557 C | 12/2014 |
| DE | 102006031143 A1 | 1/2008 |
| EP | 2053674 B1 | 12/2012 |
| EP | 2654107 A1 | 10/2013 |
| WO | WO 2003/052843 A2 | 6/2003 |
| WO | WO 2008/051508 A2 | 5/2008 |
| WO | WO 2009/016521 A2 | 2/2009 |
| WO | WO 2016/057666 A1 | 4/2016 |
| WO | WO 2016/065230 A1 | 4/2016 |

OTHER PUBLICATIONS

International Searching Authority, International Search Report and Written Opinion for International Application No. PCT/US2015/054489, dated Dec. 29, 2015, 8 pages, United States Patent and Trademark Office, U.S.A.

International Searching Authority, International Search Report and Written Opinion for International Application No. PCT/US2015/057063, dated Jan. 22, 2016, 6 pages, United States Patent and Trademark Office, U.S.A.

Toon, John, "Smart Hydrogel Coating Creates "Stick-slip" Control of Capillary Action", *Georgia Tech News Center*, Jul. 27, 2015, 5 pages, retrieved from <http://www.news.gatech.edu/2015/07/25/smart-hydrogel-coating-creates-%E2%80%9Cstick-slip%E2%80%9D-control-capillary-action> on Jan. 14, 2017.

Usui, Hiroyuke, et al., "Novel Composite Thick-Film Electrodes Consisted of Zinc Oxide and Silicon for Lithium-Ion Battery Anode", International Journal of Electrochemical Science, 2012 (published May 1, 2012), pp. 4322-4334, vol. 7, retrieved from <http://www.electrochemsci.org/papers/vol7/7054322.pdf> on Jan. 14, 2017.

Robert Pfeffer, Synthesis of Engineered Particulates With Tailored Properties Using Dry Particle Coating, Powder Technology 117, 2001, 40-67.

Jun Yang, Dry Particle Coating for Improving the Flowability of Cohesive Powders, Powder Technology 158, 2005, 21-33.

Vladimir Neburchilov, A Review on Air Cathodes for Zinc-Air Fuel Cells, Journal of Power Sources 195, 2010, 1271-1291.

Pund, K., "Recovery Act: Nanoengineered Ultracapacitator Material Surpasses the $/kW Threshold for Use in EDV's," EnerG2, May 16, 2012. http://www1.eere.energy.gov/vehiclesandfuels/pdfs/merit_review_2012/energy_storage/arravt011_es_pund_2012_p.pdf.

ENERG2 Press Release "EnerG2 nano-structured hard carbon boosts Li-ion anode capacity by >50% compared to standard graphite," Mar. 27, 2013, http://www.greencarcongress.com/2013/03/energ2-20130327.html.

* cited by examiner

3D Front View Press-o-Film 20

3D Side View Press-o-Film 20

ZINC-AIR ELECTROCHEMICAL CELL

CROSS REFERENCE TO RELATED APPLICATIONS

This application is a continuation-in-part of PCT patent application number PCT/US2015/054489 filed on Oct. 7, 2015, which claims priority to U.S. provisional patent application Ser. No. 62/061,348 filed on Oct. 8, 2014. This application is also a continuation-in-part of PCT patent application number PCT/US2015/057063 filed on Oct. 23, 2015, which is a continuation-in-part of International Application No. PCT/US2015/054489 filed Oct. 7, 2015, and claims priority to U.S. provisional patent application Ser. No. 62/067,756 filed on Oct. 23, 2014.

FIELD OF INVENTION

The present invention relates to an electrochemical cell design for zinc-air batteries. In particular, the selection of conductive carbons, means of laminating/structuring the air electrode and selectively using additives, potentially in the air electrode and/or in the zinc, can be coordinated to improve the overall reliability and performance of the resulting battery.

BACKGROUND

Zinc-air electrochemical cells are finding increasing use in small devices, such as hearing aids. These devices are trending toward higher drain rates and/or higher functional end point voltages, at least partially in response to increased usage of wireless protocols and a more competitive landscape fueled by a growing population of people who need hearing aids.

Zinc-air batteries rely on oxygen from the atmosphere to act as the cathode reactant. The air diffuses into the cell through an air electrode structure that catalytically promotes the reduction of oxygen in the presence of an aqueous electrolyte. The resulting cell possesses a high energy density, owing to the fact that only one electrode material (zinc) must be provided, but relatively low power output/rate capability. Also, the reliance upon ambient air means that once the air electrode structure is exposed, the cell may dry out.

One of the challenges in designing zinc-air batteries relates to the multiplicity of potential components in both the positive (air) and negative (zinc) electrodes which can influence the overall performance of the cell, both in terms of capacity and rate capability. In the air electrode, a failure to properly engineer the external face (i.e., the side of the electrode exposed to the ambient atmosphere) with sufficient hydrophobic properties could lead to unwanted moisture "flooding" the electrode surface and impeding performance, whereas a corresponding absence of hydrophilicity on the opposing, internal side could impede the mechanisms necessary for the electrochemical reaction to proceed at an optimal rate. In the zinc electrode, gassing, passivation and/or other unwanted interactions between the active and inactive components can have deleterious effects. In both cases, the use of inactive additives and components to potentially mitigate these effects must be balanced against the desired performance traits, insofar as inactive components occupy volume in the cell that could otherwise be devoted to active material(s).

Many past attempts at improving zinc-air cell performance have focused on a single component or single additive. In doing so, these solutions often failed to consider or acknowledge the corresponding, and sometimes negative, effects that these single component/additive solution have on the other aspects of the cell design.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which:

FIG. 1 illustrates an elevational view, in cross-section, of a metal-air cell with a catalytic electrode.

FIG. 2 depicts a three dimensional image of the profile of the air electrode surface according to certain embodiments of the invention.

FIG. 3 illustrates a type of "anilox" roller that may be useful in laminating certain embodiments of the air electrode associated with the invention, with an exploded view to depict the uniform texture of the roll, with light areas in the exploded view showing elevated portions in comparison to the dark areas in that view.

FIG. 4 is a scanning electron microscopic image of an air electrode formulation that has been mixed at high shear to induce fibrillation, including particulate coating and fiber or macro-rope formation, according to certain embodiments of the inventions.

Figure 5A:
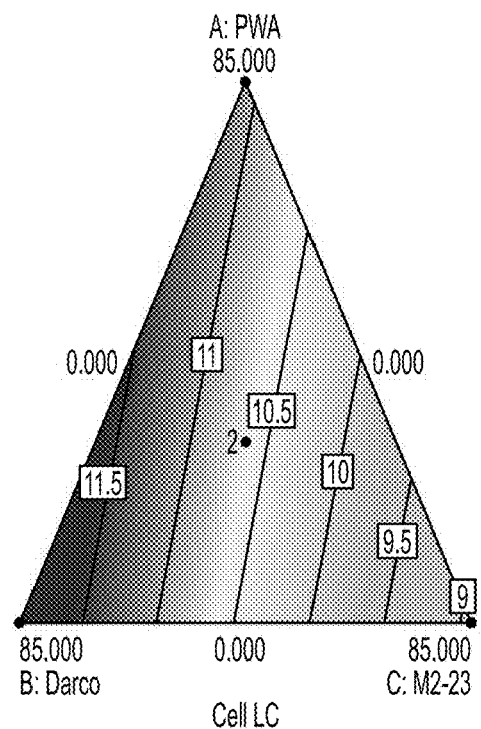
FIG. 5A is a ternary diagram showing the amount of current that a cell can support at 1.1 volt for 1 minute, for air electrodes having different mixtures of three different carbons, with 15% Teflon.

FIG. 5A is a ternary diagram showing the amount of current that a cell can support at 1.1 volt for 1 minute, for air electrodes having different mixtures of three different carbons, with 15% Teflon.

Figure 5B:
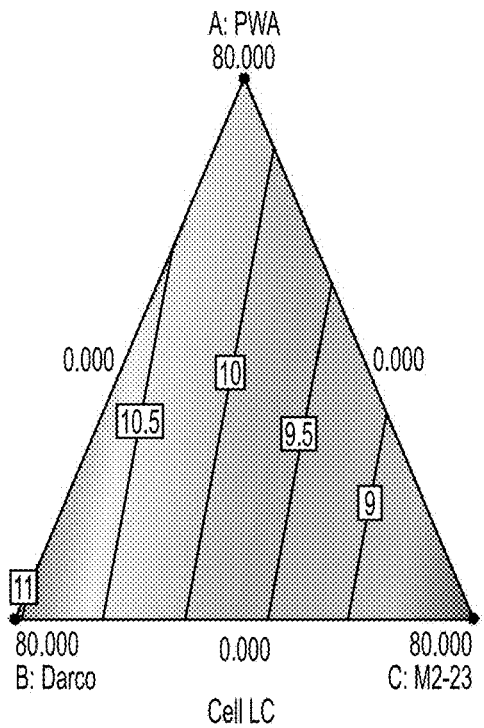
FIG. 5B is a ternary diagram showing the amount of current that a cell can support at 1.1 volt for 1 minute, for air electrodes having different mixtures of three different carbons, with 20% Teflon.

FIG. 5B is a ternary diagram showing the amount of current that a cell can support at 1.1 volt for 1 minute, for air electrodes having different mixtures of three different carbons, with 20% Teflon.

FIG. 6A is a ternary diagram showing performance on the Wireless Service test, for air electrodes having different mixtures of three different carbons, with 15% Teflon.

Figure 6B:
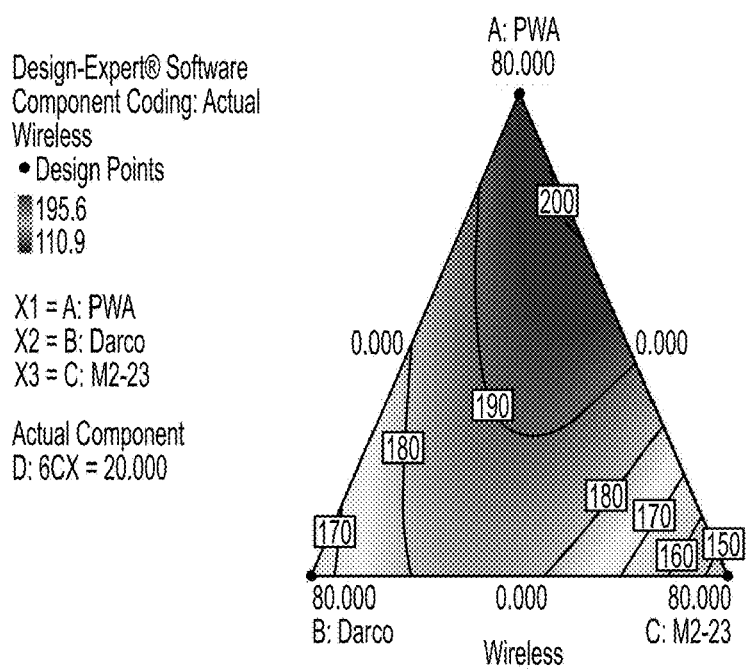
FIG. 6B is a ternary diagram showing performance on the Wireless Service test, for air electrodes having different mixtures of three different carbons, with 20% Teflon.

FIG. 6B is a ternary diagram showing performance on the Wireless Service test, for air electrodes having different mixtures of three different carbons, with 20% Teflon.

FIG. 7A is a ternary diagram showing performance on the 5 mA continuous test, for air electrodes having different mixtures of three different carbons, with 15% Teflon.

Figure 7B:
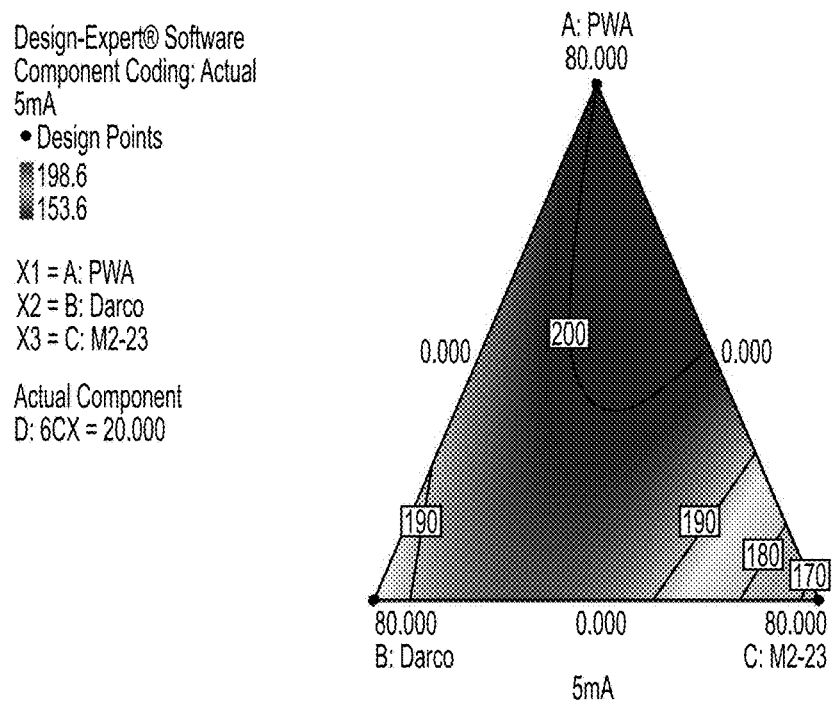
FIG. 7B is a ternary diagram showing performance on the 5 mA continuous test, for air electrodes having different mixtures of three different carbons, with 20% Teflon.

FIG. 7B is a ternary diagram showing performance on the 5 mA continuous test, for air electrodes having different mixtures of three different carbons, with 20% Teflon.

FIG. 8A is a ternary diagram showing "air up" time, for air electrodes having different mixtures of three different carbons, with 15% Teflon.

Figure 8B:
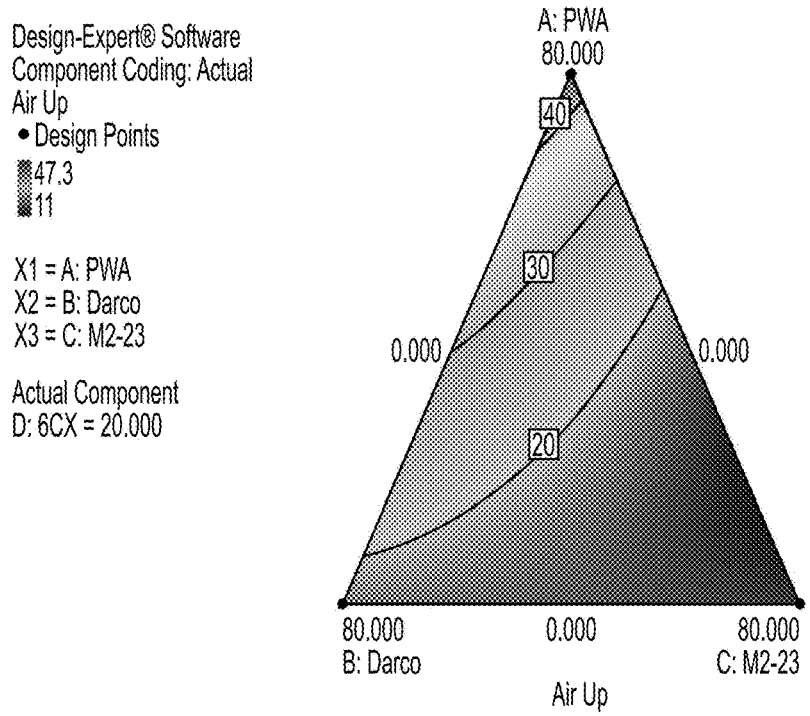
FIG. 8B is a ternary diagram showing "air up" time, for air electrodes having different mixtures of three different carbons, with 20% Teflon.

FIG. 8B is a ternary diagram showing "air up" time, for air electrodes having different mixtures of three different carbons, with 20% Teflon.

FIG. 9 represents the preferred formulation range.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, unless context suggest otherwise, the articles "a" and "an" are generally intended to mean "one or more" and the use of plural may be exemplary rather than mandatory.

As shown in an example of an electrochemical cell according to the invention is shown in FIG. 1. The cell 110 can include a cathode casing 112 and an anode casing 126. At least one aperture 118 is present in the cathode casing 112 to act as an air or oxygen entry port. A catalytic positive electrode (such as an air electrode) 120 is disposed near the aperture 118 in the cathode casing 112.

The catalytic electrode 120 can include a catalytic layer containing a mixture of carbon, a catalyst, and a binder. Catalytic electrode 120 preferably has a barrier layer 122 laminated thereon. The barrier layer 122 can be laminated on the side of the catalytic electrode closest to the aperture 118 cell. Catalytic electrode 120 can also contain an electrically conductive current collector 123 embedded therein, preferably on the side of the electrode opposite the barrier layer 122. The cell 110 may optionally contain a second barrier layer 137 between the first barrier layer 122 and central region 114 of the surface of the cathode casing 112 containing the aperture 118. The barrier layers 122, 137 have a low enough surface tension to be resistant to wetting by electrolyte, yet porous enough to allow oxygen to enter the electrode at a rate sufficient to support the desired maximum cell reaction rate. Certain aspects of the barrier layers 122, 137 and/or the catalytic electrode 120, including the selection of conductors, lamination of the constituent components and methods of manufacturing these components are related to the synergistic benefits inherent to this invention and, consequently, will be described in greater detail below.

At least one layer of separator 124 is positioned on the side of the catalytic electrode 120 facing the anode 128. The separator 124 is ionically conductive and electrically non-conductive. The total thickness of the separator 124 is preferably thin to minimize its volume, but must be thick and strong enough to prevent short circuits between the anode 128 and catalytic electrode 120. The separator 124 can be adhered to the surface of the catalytic electrode 120 to provide good ion transport between the electrodes and to prevent the formation of gas pockets between the catalytic electrode 120 and the separator 124. Similarly, adjacent layers of the separator 124 can be adhered to each other. A layer of porous material 138 can be positioned between catalytic electrode 120 and the surface of cathode casing 112 to evenly distribute oxygen to catalytic electrode 120.

A catalytic layer 121 contains a catalytic composition that includes composite particles comprising catalyst or nano-catalyst particles adhered to (e.g., adsorbed onto) the external and internal surfaces (including surfaces of open pores) of highly porous carbon substrate particles. As will be discussed in greater detail below, the inventors have now found that the selection and utilization of different, specific types of carbon from different, specific sources appears to have an unexpected, synergistic effect on cell performance when these multiple carbons are used with other features described herein.

Examples of zinc air cell cathode construction that can be used in conjunction with the present invention are disclosed in U.S. Patent Application Publication No. 2008/0155813 A1. Cell sizes of particular applicability to the invention include International Electrotechnical Commission (IEC) standard cell designations PR536, PR41, PR48 and PR44 (commonly referred to as hearing aid battery sizes 10, 312, 13 and 675, respectively), although additional designations and form factors may be amenable to the concepts disclosed herein. Consequently, certain parameters of the invention will be expressed on a standardized surface area basis to allow comparison and conversion between these varying cell sizes.

A sealant 129 can be used to bond portions of the catalytic electrode 120 to the cathode casing 112. The anode casing 126 can have a rim 135 that is flared outward at its open end. Alternatively, a cell can essentially straight side walls with little or no outward flare or a rim that is folded outward and back along the side wall to form a substantially U-shaped side wall with a rounded edge at the open end of the casing. The anode casing 126 can have an inner surface 136 in contact with the anode mixture 128 and electrolyte.

Cell 110 can includes a gasket 130, made from an elastomeric material for example, to provide a seal between the cathode casing 112 and anode casing 126. The bottom edge of the gasket 130 can be formed to create an inwardly facing lip 132, which abuts the rim of anode casing 126. Optionally, a sealant may be applied to the sealing surfaces of the gasket 130, cathode casing 112 and/or anode casing 126. A suitable tab (not shown) can be placed over the openings 118 until the cell 110 is ready for use, to keep air from entering the cell 110 before use.

The anode casing 126 forms the top of the cell and has a rim 135 which is flared outward at its open end. Alternatively, a cell can have a refold anode casing in which the rim is folded outward and back along the side wall to form a substantially U-shaped side wall with a rounded edge at the open end of the casing, or the anode casing can have essentially straight side walls and that has a rim with little or no outward flare.

The anode casing 126 can be formed from a substrate including a material having a sufficient mechanical strength for the intended use such as stainless steel, mild steel, cold rolled steel, aluminum, titanium or copper. Preferably the anode casing includes one or more additional layers of material to provide good electrical contact to the exterior surface of the anode casing 126, resistance of the external surface to corrosion, and resistance to internal cell gassing where the internal surface of the anode casing 126 comes in contact with the anode 128 or electrolyte. Each additional layer can be a metal such as nickel, tin, copper, or indium, or a combination or alloy thereof, and layers can be of the same or different metals or alloys. Examples of plated substrates include nickel plated steel, nickel plated mild steel and nickel plated stainless steel. Examples of clad materials (i.e., laminar materials with at least one layer of metal bonded to another layer of metal) include, as listed in order from an outer layer to an inner layer, two-layered (biclad) materials such as stainless steel/copper, three-layered (triclad) materials such as nickel/stainless steel/copper and nickel/mild steel/nickel, and materials with more than three clad layers.

The anode casing 126 can include a layer that is post-plated (i.e., plated after forming the anode casing into its desired shape). The post-plated layer is preferably a layer of metal with a high hydrogen overvoltage to minimize hydrogen gassing within the cell 110. Examples of such metals are copper, tin, zinc, indium and alloys thereof. A preferred metal is tin, and a preferred alloy is one comprising copper, tin and zinc.

Cell 110 also includes a gasket 130 made from an elastomeric material which serves as the seal. The bottom edge of the gasket 130 has been formed to create an inwardly facing lip 132, which abuts the rim of anode casing 126. Optionally, a sealant may be applied to the sealing surface of the gasket, cathode casing and/or anode casing. Suitable sealant materials will be recognized by one skilled in the art. Examples include asphalt, either alone or with elastomeric materials or ethylene vinyl acetate, aliphatic or fatty polyamides, and thermoplastic elastomers such as polyolefins, polyamine, polyethylene, polypropylene and polyisobutene.

During manufacture of the cell, anode casing 126 can be inverted, and then a negative electrode composition or anode mixture 128 and electrolyte put into anode casing 126. The anode mixture insertion can be a two-step process wherein dry anode mixture materials are dispensed first into the anode casing 126 followed by KOH solution dispensing. Alternatively, the wet and dry components of the anode mixture are preferably blended beforehand and then dispensed in one step into the anode casing 126. Electrolyte can creep or wick along the inner surface 136 of the anode casing 126, carrying with it materials contained in anode mixture 128 and/or the electrolyte. The amount of the electrolyte dispensed takes into account both the desired electrolyte to zinc ratio (a weight ratio) and the void volume desired within the cell.

An example of an anode mixture 128, for a button cell comprises a mixture of zinc, electrolyte, and organic compounds. The anode mixture 128 preferably includes zinc powder, a binder such as CARBOPOL® 940 or CARBOPOL® 934, and a gassing inhibitor such as indium hydroxide (In(OH)$_3$) in amounts of about 99.7 weight percent zinc, about 0.25 weight percent binder, and about 0.045 weight percent indium hydroxide. CARBOPOL® 934 and CARBOPOL® 940 are acrylic acid polymers in the 100% acid form and are available from Noveon Inc. of Cleveland, Ohio. A preferred alternative gelling agent is SANFRESH™ DK-300 a sodium salt of an acrylic acid polymer available from Sanyo Chemical Industries Ltd., Kyoto, Japan.

The electrolyte composition for a button cell can be a mixture of about 97 weight percent potassium hydroxide (KOH) solution where the potassium hydroxide solution is 28-40 weight percent, preferably 30-35 weight percent, and more preferably about 33 weight percent aqueous KOH solution, and about 1.00 to 3.00 weight percent zinc oxide (ZnO). Any specific whole integers between the stated ranges for potassium hydroxide weight percent are contemplated (e.g., 29, 34, 38, etc.), as are one tenth increments for weight percent zinc oxides (e.g., 1.10, 2.30, 2.70, etc.).

Nano zinc oxide can also be added to the anode and can provide advantages relative regular zinc oxide. It should be noted that nano zinc oxide is available from several sources today based on its use in paints. For example; Bruggemann Chemical, NanoPhase Technologies, and Grillo provide nano zinc oxide. Surface areas can range from 20 to 100 square meters per gram. Additional, more preferred upper limits includes 100, 90, 80, 70, 60, 50, 40 or 30 square meters per gram, whereas the lower limits may be 20, 30, 40, 50, 60, 70, 80 or 90 square meters per gram. These upper and lower limits may be paired in any combination (e.g., 20 to 70; 40 to 100; 70 to 80; etc.).

Preferred zinc powders are low-gassing zinc compositions suitable for use in alkaline cells with no added mercury. Examples are disclosed in U.S. Pat. No. 6,602,629 (Guo et al.), U.S. Pat. No. 5,464,709 (Getz et al.) and U.S. Pat. No. 5,312,476 (Uemura et al.), which are hereby incorporated by reference.

One example of a low-gassing zinc is ZCA grade 1230 zinc powder from Zinc Corporation of America, Monaca, Pa., which is a zinc alloy containing about 400 to about 550 parts per million (ppm) of lead. The zinc powder preferably contains a maximum of 1.5 (more preferably a maximum of 0.5) weight percent zinc oxide (ZnO). Furthermore, the zinc powder may have certain impurities. The impurities of chromium, iron, molybdenum, arsenic, antimony, and vanadium preferably total 25 ppm maximum based on the weight of zinc. Also, the impurities of chromium, iron, molybdenum, arsenic, antimony, vanadium, cadmium, copper, nickel, tin, and germanium preferably total no more than 68 ppm of the zinc powder composition by weight. More preferably, the zinc powder contains no more than the following amounts of iron, cadmium, copper, tin, chromium, nickel, molybdenum, arsenic, vanadium, antimony, and germanium, based on/the weight of zinc: Fe—3.0 ppm, Cd—8 ppm, Cu—8 ppm, Sn—1 ppm, Cr—1 ppm, Ni—1 ppm, Mo—0.25 ppm, As—0.1 ppm, Sb—0.2 ppm, V—1 ppm, and Ge—0.06 ppm. The lower preferred limit for each of the impurities identified in this paragraph would be as close to 0 ppm as is reasonably practical.

In another embodiment, the zinc powder preferably is a zinc alloy composition containing bismuth, indium and aluminum. The zinc alloy preferably contains about 100 ppm of bismuth, 200 ppm of indium, and 100 ppm of aluminum. The zinc alloy preferably contains a low level of lead, such as about 35 ppm or less. In a preferred embodiment, the average particle size (D50) is about 90 to about 120 microns. Examples of suitable zinc alloys include product grades NGBIA 100, NGBIA 115, and BIA available from N.V. Umicore, S.A., Brussels, Belgium. The values stated for zinc alloy compositions are nominal, and other useful levels of alloys may be possible.

The selection of zinc additives, for corrosion control, can be very challenging. Since these additives are often surfactants and other agents which have interactions with other components, they can influence viscosity and rheology properties.

Surfactants form films on the zinc surface which impact cell impedance and rate capability, and can influence the solubility of ZnO. They are often extremely concentration dependent which further complicates their evaluation. Surfactants used in zinc air cell anode formulations such as Disperbyk 102 and Carbowax 550 are extremely concentration sensitive and have significant impact on front end rate capability and cell impedance. It is desired to use a zinc additive which forms a thin but dense film on the zinc surface and is robust to concentration effects above the monolayer requirement.

In order to find a zinc additive that provides a thin but dense film on the surface of zinc which effectively reduces corrosion without having a negative impact on cell impedance and high rate performance, a sulfotricarballylate which is a fluorosurfactant with short chain, branched fluorocarbon end groups and carboxylate acid anchor groups was used as a zinc additive in an alkaline zinc air cell. The sulfotricarballylate is available as Tivida L2300 from EMD Millipore, also known as Merck Millipore outside the United States and Canada.

PCT patent application number US15/54489, filed on Oct. 7, 2015, discloses short-branched chain fluorosurfactants that may be useful as zinc corrosion inhibitors in electrochemical cells. The disclosure of this application is incorporated by reference herein as examples of other preferred surfactants for use in the invention.

PCT patent application number US/15/57063, filed on Oct. 23, 2015, discloses the use of functionalized barium sulfate as an additive in zinc-air and zinc-manganese dioxide electrochemical cells. The disclosure of this application is incorporated by reference herein as examples of other preferred additives for use in the invention.

Numerous carbons have been used in electrochemical cells to improve discharge performance characteristics. These include carbon black, acetylene black and graphite and, generally speaking, each is an elemental carbon characterized by a pre-defined set of physical characteristics and method of manufacture. For example, carbon black is typically made by combustion/thermal decomposition of hydrocarbons, with acetylene black being a particular, highly pure form of carbon black. Additional physical or chemical treatment of carbon black can impart or influence the presence of "active" functional groups. In contrast, graphite is a carbon allotrope in its natural form or produced synthetically. In either case, graphite can be subjected to further chemical and/or mechanical treatment to impart certain desired characteristics or properties, such as crystalline structure, texture (as characterized by xylene density, BET specific surface area, bulk density, tap density, etc.), particle size, morphology, purity and/or spacing between its crystal lattice planes. In all cases, graphite exhibits a density that is almost identical to that of activated carbon (i.e., ~2.2 g/cm$^3$), but it has a BET surface area that is significantly smaller (e.g., usually <20 m$^2$/g for synthetic types and 10 m$^2$/g for natural types).

Carbon blacks are sold by numerous entities, including Timcal of Westlake, Ohio, U.S.A. Various acetylene black powders are sold by numerous entities, including Soltex Corporation of Houston, Tex., U.S.A. Synthetic, mechanically expandable graphite is sold by numerous entities, including Timcal of Westlake, Ohio, U.S.A., while natural graphite is available from numerous entities, including Superior Graphite of Chicago, Ill., U.S.A.

Ultimately, each of these aforementioned carbon categories possessed an agreed upon set of the physical characteristics observed after the manufacturing process, including but not limited to dimensions (size, length, diameter, aspect ratio, etc.), morphology, density, particle size, particle size distribution and surface area of the particles/powder, crystalline structure and carbon content/impurities (including but not limited to active functional groups, ash, sulfur, etc.). Conventionally speaking, these parameters were identified as significant because it was believed these physical characteristics determined how the carbon(s) interact with other components in the electrode formulation (e.g., active materials, surfactants, rheology or other additives, etc.). Furthermore, these specific physical characteristics often dictated the classification of the carbon (e.g., carbon black vs. acetylene black) without regard for the original source of the elemental carbon itself.

For the sake of clarity and without intending to exclude other known methods of measurement, the following examples indicate ways in which these physical characteristics may be measured:

Purity by ash content, moisture or carbon content;
Crystalline structure by x-ray diffraction;
Real density (e.g., xylene density, helium density, etc.);
Particle size distribution by laser diffraction, air classification, sieving, tap density or oil absorption;
Porosity/texture by gas adsorption, BET specific surface area, microscopy or mercury porosimetry; and
Surface morphology by gas adsorption, Raman spectrometry or active surface area measurements.
With respect to qualitative and quantitative aspects of functional groups present in active carbons, Boehm titration, thermal gravity analysis, Fourier transform infrared spectroscopy, x-ray photoelectron spectroscopy, temperature-programmed thermodesorption or secondary mass spectrometry.

Any of the foregoing methods, including combinations of several of these methods/characteristics, have been used to define a particular carbon according to the categories noted above. Further, it may be possible to characterize an unknown carbon by comparing any of the foregoing against corresponding measurements from a known source or sources so as to establish the likely provenance of that unknown carbon.

A separate system of classifying carbons is to distinguish between active (or activated) carbon, "soft" carbon and "hard" carbon. Rather than relying on the conventional definitions provided above for carbon black, acetylene black and graphite (as commonly seen in past publications describing batteries), active carbons are any carbon-containing material with high-surface area (i.e., 450 to 1,000 or more m$^2$/g) and high porosity with well-defined pore structure (i.e., the pore distribution possesses a relatively narrow range of diameters) produced by thermal activation and/or chemical activation.

Soft carbons are organic materials that have been carbonized by heat treatment in an inert atmosphere. The resulting graphitized carbons have anisotropic properties and possess low surface area and low porosity.

Hard carbons result from organic materials that have been subjected to heat treatment but do not develop any significant degree of crystalline/three-dimensional lattice structure and, instead, have isotropic bulk properties and higher surface area (in comparison to soft carbons) and high pore volume within a microporous network.

In order to better distinguish between activated carbons and hard carbons in this paradigm, it is possible to think of activated carbons as having a deliberate alteration to their surface area after the carbon has been formed. In contrast, hard carbons are formed with their inherent surface characteristics, so that no subsequent surface treatments are performed, needed or desired.

Some publications have classified carbon powders appropriate for use in zinc-air cells based upon their intended use within the cell. For example, col. 5, line 36 to col. 6, line 3 of U.S. Pat. No. 9,136,540 (the '540 patent) distinguishes carbon on the basis of whether is electrically conductive or catalytically active, although (per the disclosure of this patent) these distinctions are not meant to limit the utility of the carbon at issue. Graphite and carbon black are exemplified as possible electrically conductive carbon powders, while only active carbon is flagged as being catalytically active. Wide ranges (10%-90%) of catalytic carbons are described as comprising the mass of the air electrode. And the majority of the powders should have a small particle size (<325 mesh or <44 micrometers), with all powders in the cell being porous and having a total BET surface area between 200 and 2000 $m^2/g$. Notably, the activated carbons are described as having a narrow range of BET surface area between 900 and 1200 $m^2/g$. The activated carbon, in combination with graphite, is described as providing a carbon support for crystalline or amorphous manganese oxide catalyst. Carbon black is provided to wet proof and to impart electrical conductivity to the air electrode.

Owing to challenges in mixing different carbons and/or maintaining electrical conductivity between them, designers of conventional zinc-air cells—and especially miniature zinc-air cells—usually relied on a single carbon in the air electrode formulation. That carbon must provide: conductivity, oxygen absorption, oxygen reduction, balance hydrophilic and hydrophobic properties, and balance macro and micro pore structure for the three phase reaction process. However, many of these characteristics are inter-related, if not competing and contradictory. Consequently, except for the '540 patent, most publications indicate the use of a single carbon is preferred to simplify the manufacturing process and to minimize the risk of unwanted, deleterious interactions between multiple carbons and/or between the carbons and other cell components.

The inventors have now found that carbons can be categorized based upon the source of the carbon material itself. That is, the inherent performance characteristics of carbons can be differentiated—and ultimately exploited—based on the origin of the carbon without defining the carbon at issue by a set of pre-defined physical characteristics. Indeed, past attempts to characterize carbons solely on the basis of physical attributes, such as BET surface area and the like, do not adequately reflect the potential interactions and impact of impurities and structural features inherent to how that particular carbon was formed. Further, by mixing different types of carbons from different sources, it is possible to optimize the inherent advantages of the individual carbons, especially in view of the additional cell design features disclosed herein, in order to realize a synergistic effect.

A wide array of publications, including the '540 patent, recognized a particular grade of activated carbon, Type PWA carbon sold by Calgon Corporation of Pittsburgh, Pa., as the most preferred (and usually only) carbon for use in air electrodes. A single publication, paragraph of United States patent publication no. 2008/0155813 (the '813 publication), further identified PWA carbon as an active carbon based on a coal source. Nevertheless, the '813 publication—like the a significant number of patents reviewed by the inventors—names only one carbon as being appropriate or preferred, and nothing in this publication or any of the others reviewed by the inventors suggests alternative, source-based identification of carbons.

Consistent with the foregoing, the inventors classify one type of carbon useful in their invention as coal-based carbon. Insofar as coal is formed according to geological processes and are typically extracted from the ground, coal-based carbons are relatively well known and understood as a specific type of carbons. As evidenced by the publication in the preceding paragraph, coal carbons may be treated so as to also be classified as active carbons.

Additionally, the inventors identified plant/lignin-based carbons as being useful for their invention. Such plant/lignin-based carbons are non-fossilized materials derived from recently harvested vascular plants, algae and similar organisms. One example of such a carbon is sold as Darco G60 (CAS Number 7440-44-0) by Norit Americas, Inc., which is now owned and operated by Cabot Corporation based in Boston, Mass.

Finally, polymer-based carbons represent a third distinct group of carbons. These carbon products are synthesized in a controlled environment and usually display extremely high purity with distinct, tailored characteristics. Indeed, because polymer-based carbons provide an opportunity to selectively engineer desired properties, polymer carbons are particularly well-suited to supplement traits that available coal and/or plant/lignin based carbons may lack. Companies such as EnerG2 in Seattle, Wash. sell such products as the M2-series of carbon additives.

In one embodiment, when carbon from all three sources—coal, plant/lignin and polymer—are mixed and utilized in the air electrode, the overall performance electrode can be better controlled and improved. A 1:1:1 (by weight) mixture of carbons provides benefits, although further optimization is possible, and potentially even preferred, depending upon the precise nature of the carbons and rate capability and capacity requirements of the battery. By way of further example, any combination based on whole integers within the stated ranges are possible according to the invention, so long as each component comprises at least 10 wt. % and no more than 80 wt. %. When A represents coal-based carbon, B represents lignin-based carbon and C represents polymer-based carbon, the relative amounts of conductor by weight may be expressed as A:B:C and A+B+C≤100, with A=10 to 80, B=10 to 80 and C=10 to 80 (note that, when A+B+C=100, A, B and C may be treated as weight percentages, wt. %). More specifically, the following criteria are even more preferred: 10≤A≤50, 10≤B≤20 and C=10. Nevertheless, other combinations are possible. The resulting formulation helps to desensitize the air electrode, with each carbon contributing the total electrode performance.

Three exemplary carbons from different sources, including a selection of salient physical properties, are shown in Table 1 below. These properties may apply to all embodiments of the invention disclosed herein.

TABLE 1

Exemplary ranges of functionality, acidity/basicity, pH, Fe, particle size, surface area, porosity, density for source comparison of preferred carbons.

| Source | Carboxylic ueq/g | Lactonic ueq/g | Phenolic ueq/g | Total Acid ueq/g | Total Base ueq/g | pH n/a | Fe Add Sol ppm | Fe K OH sol ppm | d50 Micrometers | BET $m^2/g$ | Micropore $cm^3/g$ | Density $g/cm^3$ |
|---|---|---|---|---|---|---|---|---|---|---|---|---|
| PWA – Coal (A) | 61-88 | 36-57 | 85-139 | 183-284 | 278-342 | 6.0 | 586 | 14 | 25 | 918-921 | 0.24-0.27 | 2.292 |
| Darco G6 – Lignin (B) | 39-54 | 20-22 | 65-84 | 126-157 | 298-380 | 6.6 | 193 | 7 | 23 | 803-822 | 0.22-0.24 | 2.202 |
| EnerG2 M2 – Polymer (C) | <1 | 22-26 | 128-130 | 133-140 | 235-353 | 6.7 | 4 | 0 | 50 | 1466-1728 | 0.47-0.48 | 2.486 |

In other embodiments, a hard carbon with very low, and more preferably essentially no, carboxylic functional groups is combined with at least one other carbon, preferably an activated carbon, and more preferably with two carbons including at least one activated carbon. The other carbon(s) have carboxylic functionality and may also include lactonic and/or phenolic groups. The "very low" carboxylic functionality can be established comparatively, with a hard carbon having at least an order of magnitude lower amounts of carboxylic groups in comparison to the activated carbon(s) provided to the mix. Provided the hard carbon has no to very low carboxylic functionality, the total acidity of the hard carbon may still be similar to that of the other carbons. In total, the final mixture of carbons should exceed 250 ueq/g in total acidity. As an alternative measure, the pH of the carbon components could serve as relative measure of their functionality, although such measurements may be more sensitive to variations based upon the measurement technique. Additional characteristics, including those identified in table 1, may be useful in distinguishing between the carbon sources according to certain embodiments of the invention.

The BET surface area of the hard carbon in these embodiments is in excess of 1400 square meters per gram, and more preferably at least 1500 square meters per gram. The other carbon or carbons have a BET surface area and density that are individually less than that of the hard carbon, but in all cases, all of the carbons in this embodiment possesses a BET surface area greater than 500 square meters per gram and, more preferably, greater than 800 square meters per gram. The total BET surface area of the mixture should exceed 1000 square meters per gram in some preferred embodiments.

Similarly, the other carbon(s) also have a micropore volume that is less than the hard carbon, with the other carbons all less than one third and more preferably less than one half the micropore volume of the hard carbon. Preferably, the total micropore volume for the mixture is between 0.20 and 0.35 $cm^3/g$, with a more preferred range between 0.25 and 0.30 $cm^3/g$.

The ratio of carbons and their associated properties relative to micropores, macro electrode pores, oxygen absorption and oxygen reduction as well as the balance of hydrophilic and hydrophobicity can be utilized to define a cell's open circuit voltage (OCV). OCV is a significant cell characteristic for miniature zinc-air batteries insofar as lower OCV typically translates into increased air up time (i.e., the amount of time it takes to produce useful voltage after introducing air to the air electrode), and it should be understood that (unless noted to the contrary) such measurements are taken when the cell is on tab or taped and, therefore, not exposed/open to oxygen.

Yet another embodiment contemplates determining the preferred mixture of carbon based upon a balanced consideration of minimizing air-up time and maximizing cell performance characteristics, particularly with respect to OCV and on low and high rate continuous tests, as well as the wireless test (an intermittent service test). As above, PWA and Darco G60 can be classified as activated carbons of coal and plant/lignin origin (respectively), while M2 is a hard or polymer carbon. With approximately 20 wt. % of the mix dedicated to binder (e.g., Teflon), preferred weight percentages for carbons in that mix range from approximately 40 to 65 wt. % for the coal/active carbon, 0 to 30 wt. % for the plant/active carbon and 3 to 15 wt. % of polymer/hard carbon. These exemplary formulations also contemplate the use of preferred surfactants, additives and the other aspects of the invention disclosed herein.

It also is believed that zinc corrosion influences OCV by consuming oxygen within the semi-sealed air cell, possibly contributing to pneumatic forces that displace air (i.e., cathode active material) with electrolyte. The inventors have now found that a change in the type of carbons used in the air electrode unexpectedly altered this response. Specifically, it is believed that an interaction between the anode and air electrode suggests that the alternative carbons may form a stronger bond with the oxygen, thereby reducing/preventing displacement of that oxygen by electrolyte.

The inventors have also observed that high rate performance zinc-air cell is dictated, at least in part, by failure and/or flooding of the air electrode. On a light drain (such as 9.3 $mA/cm^2$), the end of life for the cell is most often dictated primarily by anode efficiency. However, as the drain rate is increased to higher rates (e.g., 12.0 to 16.0 $mA/cm^2$), the air electrode dominates the cell's end of life performance. In fact, cell testing at 15.4 $mA/cm^2$ continuous drain rates in pure oxygen at slightly positive pressure with minimal air electrode failures verified that oxygen starvation is the most likely normal failure mode (note: although tests were conducted in an AZ13-sized miniature air cell, the information and invention(s) described herein should possess broad applicability, especially in all standard miniature air cell sizes). Therefore, in addition to selection of compatible carbon blends, other improvements further contributed to the holistic cell design and improvements delivered by certain embodiments of the invention: pattern lamination to improve the performance of the control air electrode, additives to further influence hydrophobic properties in the air electrode formulation and high shear mixing of the air electrode mix to induce particulate coating and/or improve its rate performance.

First, the catalyst (or "active") layer of the electrode should be laminated to barrier membranes on either side. These membranes help to control gas and liquid ingress and egress to the electrode. On the external facing side, a hydrophobic membrane such as polytetrafluoroethylene or PTFE (such as Teflon® sold by DuPont in Wilmington, Del.) is laminated to control gas ingress and egress within the cell. On the internal facing side, a separator and possibly other layers, preferably engineered to have a desired level of hydrophilicity to assist in drawing necessary reactants to the electrode, are typically laminated. The process of laminating these layers may take place over several different steps, and it is usually subsequent to the extrusion or formation of the catalyst layer itself (which may also be pressed, embedded or laminated to a porous current collector or otherwise extruded from a mixture of catalyst, carbon and binder). A failure to adequately bond either membrane to the electrode structure can result in a gap that permits moisture and/or electrolyte to collect, thereby limiting oxygen supply based on the oxygen solubility within the liquid boundary region created between the membrane and the electrode structure itself.

The inventors have discovered certain advantages by employing textured rollers during the lamination process. The lamination process is believed to further influence the pore structure of the air diffusion membrane layer. Because high rate performance is limited and controlled by the availability of oxygen during discharge, the use of a pattern roll to form the membrane ensures that the membrane won't limit the oxygen supply. PTFE compression during lamination was varied, but all regions were compressed through the use an "anilox" roll with regions of higher and lesser compression. In particular, anilox rollers have dimples, indentations or other textured features that result in a consistent, but not smooth, surface. Such rollers employed on membranes on the internal, external or both sides of the electrode.

It should be understood that the compressive force and pattern must still remain consistent. That is, an anilox roll may be employed in combination with a smooth backing roller, but the resulting process is consistently delivered (e.g., through constant force applied along the length of each roller) during the entire lamination process. Further, even though the ultimate compression force will vary depending upon the roller, it is important to note that the entirety of the electrode surface is compressed at some level. Ideally, some regions will experience relatively high compression in comparison to the remaining regions having only moderate compression (i.e., about 50% in comparison to the "high" compression region). Regions of non-compression (i.e., 0%) are not preferred.

FIG. 3 shows an anilox roller in which ridges and troughs are laser etched across the surface of the roller in order to create the preferred profiles of this invention, although it will be understood that other roller configurations may be employed. For example, dimples, indentations or other means of creating uniform "cells" (i.e., patterns with varied depths) may be employed. Usually, the cells are quantified on a per linear inch basis on the roller. A preferred number of cells on a roller of the present invention is 120 lines per inch, with additional preferred ranges anywhere between 100 and 140 lines per inch. The depth of the cells is ideally between 10 and 100 micrometers, with any whole integer between 20-60 micrometers being preferred embodiments.

When delivered appropriately, the resulting surface of the electrode contains a uniform series of protrusions along its length. Even if compressive force is applied consistently, the edges of the resulting laminate may still have variations in the height of the protrusions in comparison to the central portions, but the ultimate goal is to achieve as much uniformity as is possible. Three dimensional imaging may be used to profile the resulting laminate and verify the formation of protrusions. FIG. 2 shows profiles of the laminated electrode surface according to certain embodiments of the invention. It should be noted that the observed protrusions and/or indentations via imaging may not exactly correspond to the original roller and, instead, may be uniformly smaller so as to reflect additional processing, smoothing, etching or compression exerted upon the laminated electrode. Thus, the difference protrusions and indentations and the base material (i.e., the gradient) observed via imaging may be between 10 and 100 micrometers, with any whole integer between 20-60 micrometers and 30-40 micrometers being preferred embodiments.

Whether by way of after-the-fact imaging the manufactured air electrode or by through the use of an anilox-style roller during manufacturing, the preferred surface/texture of the air electrode corresponds to the protrusions and/or indentations on the electrode surface interface, as well as patterns in the roller(s) itself. Thus, the height of the protrusions and/or depth of indentations will correlate with the laminating rollers, and conclusions can be drawn as to the roller pattern by way of observing the air electrode and vice versa.

Laminating compression should be exerted in an amount that is proportionate to the materials used in the air electrode. The relative amount of binder, the desired mechanical properties of the electrode and the type of roller(s) used will all influence the precise amount, as will the initial thickness of the membrane and its desired, final porosity. Consequently, the precise lamination force may vary. However, in all cases, the force will sufficient to compress the membrane to adhere it to the electrode while simultaneously creating the textured pattern described above.

In some embodiments of the invention, the initial thickness of the diffusion membrane, the point of 100% compression (i.e., 0% porosity) of the membrane and thickness gradient (i.e., the difference between the depth of the lowest indentation and the highest protrusion in the final, laminated membrane) cooperate to inform the laminating conditions. For example, consider a membrane material having a 400 micrometer initial thickness with a nominal porosity of 30-40% and a 240 micrometers thickness at 100% compression/0% porosity. If the desired gradient is 50 microns, the compressive forces must remain within the range that sufficiently laminates the material while also imprinting the gradient but without compressing the material at its maximum of the gradient (i.e., the point of greatest compression, usually the lowest indentation in the pattern) to match or exceed the 100% compression point. Ultimately, any combination of initial and/or desired porosity, initial and/or desired thickness, maximum and/or minimum desired thickness at either or both of the maximum and minimum gradient and the gradient itself can all be used to define the final, preferred laminate.

Given the size and operating parameters of an anilox roll may vary considerably while still creating the desired gradient, it is preferred to express the laminating forces as a function of certain properties of the final, laminated combination. For example, the membrane and electrode should possess sufficient bonding to keep the membrane adhered to the electrode during manufacturing as well as the operation of the final, constructed cell (i.e., without creating gaps that allow for moisture collection as noted above). In addition, the force applied should be sufficient to compress the entire material beyond the minimum gradient (i.e., the point of least compression, usually the highest protrusion in the pattern). Thus, for a 400 micrometer thick material with a 40 micrometer gradient, the force must compress the material in excess of 40 micrometers at the maximum gradient and in excess of 0.1 micrometers at the minimum gradient. Conversely, if that material has a 100% compression/0% porosity threshold of 240 micrometers thick, the applied force cannot compress the material more than 160 micrometers at the maximum gradient and 120 micrometers at the minimum gradient. Preferred compression should be centered near the midpoint of the minimum and maximum (using the foregoing values, the midpoint would be 320 micrometers of thickness), with ranges between +/−30%, +/−20% and +/−10% of the midpoint being most preferred.

Second, the use of additives in the air electrode formulation could be leveraged to reduce flooding and improve wet-proofing. For example, hydrophobic fumed silica (such as Cab-O-Sil TS-720 made by Cabot Corporation of Boston, Mass.) may be an effective means to further improve the robustness of the electrode to flooding. Additional hydrophobic coatings, compatible with the components and design intents described herein, could be applied after formation (and/or lamination) of the air electrode. For example, hydrophobic coatings could be selectively applied, partially or completely, on the air side of the electrode, on the anode/separator side of the electrode, and/or as a spray coating of the air electrode mix prior to extrusion.

The wet proofing intent, achieved by particulate coating, is different than that associated with emulsion coating in that any wet proofing is associated with particles versus wet proofing by fibers or fibrillation, as described below. Relative to air electrodes, one can envision bonding nano catalyst onto activated carbon and or bonding nano particles of a wet proofing polymer such as Teflon onto the surface of activated carbon. In this approach to wet proofing, one starts with a nano size powder of Teflon agglomerates, which through the use of high mechanical mixing or shear are broken down to the primary particles which are than attracted to the carbon surface through weak Van der Waals forces. This process can be described by a number of terms including: dry coating, ordered mixing and structured mixing.

Third, when air electrodes have been extensively worked in the dry powder through high shear mixing, high rate performance (15.3 mA/cm$^2$ continuous) is greatly improved. Specifically, high rate performance is limited and controlled by the availability of oxygen during discharge, so improved wet proofing ensures that the available oxygen won't be limited by solubility in electrolyte. A totally dry powder mix process for producing an air electrode offers advantages in homogeneity of components and the elimination of detrimental surfactants. When PTFE and/or other binders are properly distributed within the binder/carbon/catalyst matrix and then effectively fibrillated by high shear mixing, the performance of the air electrode is greatly improved.

More specifically, the use of two blending motions is preferred: a low speed low energy plow which blends materials and presents them to a high speed chopper, with the chopper providing high speed shear for fibrillation. Alternative methods of creating this two stage mixing are possible, including but not limited to mixing within a rotating barrel with one or more blades moving in coordination with the barrel movement resulting in the desired low speed plowing and high speed chopping that for the desired fibrillation. On useful measure in this regard is the tip speed of the high shear mixing implement. In particular, a tip speed of at least 25 m/s is preferred, with a more preferred target of 26.5 m/s. The low shear implement should be sufficient to ensure that material is fed into the high shear mixing operation in consistent manner, and preferably so as to replenish the material entering the high shear zone. Ultimately, the time, speed and volume of the mixing chamber all influence the precise conditions for optimal mixing.

Additional high shear working of the mix can result in fiber formation from PTFE aggregates not broken down to individual nano particles. In fact, dry powder pre-mixing with high shear via a high speed impeller may be sufficient to induce fibrillation. Fiber formation or roping (indicated by reference element R) can be confirmed via SEM at 25,000 X as seen in FIG. 4.

Ultimately, mixing according to certain embodiments of the invention creates particulate coating, which the inventors refer to a type of "dry particle coating." In practice, particulate coating and dry particle coating contemplate the minimization—if not elimination—of surfactants while dispersing the dry mixture components sufficiently to create the desired wet-proofing properties in the resultant mixture. For example, nano-teflon species adheres to portions of the carbon surface to while still maintaining sufficient exposed surface area on the carbon to allow for its desired reactive properties. Such dry particle coating is characterized, in its final form, by the formation of fibers and particles and, in some instances, "ropes" (i.e., thicker fibers). The combination of fibers, particles and/or ropes all cooperate to impart the necessary wet-proofing and reactivity among the dry mixed components.

Selection of specific grades of PTFE may influence the ultimate size of the fibers. For example, a mixture of powders based on PTFE grade sold by DuPont as 6C and grade Fluo X-1406 sold by Micro Powder Inc, of Tarrytown, N.Y. form an effective and consistent wet proofed electrode based on a combination of particulate coating, near nano fiber formation and macro ropes. 6C powder provides the particulate coating and fiber formation while X1406 provides larger fibers or ropes which improve electrode integrity. In this embodiment, the particulate coating PTFE is provided at 30-50 times the weight percentage amount of the fibers and macro-rope producing PTFE. In one embodiment, the particulate coating powder is provided at 20 weight percent of the formulation and the macro-rope PTFE is limited to 0.5 weight percent. Other preferred ranges for the weight percentages could be plus or minus 25% of the weight percentages stated in the preceding sentence.

Taken together, a preferred air electrode can be formed from a powder comprising 50 weight percent coal-based carbon, 20 weight percent plant/lignin based carbon, 10 weight percent polymer based carbon, 19 weight percent particulate coating PTFE, 0.5 weight percent macro-rope PTFE and 0.5 weight percent hydrophobic fumed silica. The powder is mixed at high shear to induce fibrillation. Carbons are selected on precursors of coal/lignin/polymer and have been pretreated at a 5 weight percent $MnO_2$ catalyst level.

The holistic effects of the air electrode can be further amplified through the use of a preferred anode formulation consisting of: 99.29 wt. % zinc alloyed with bismuth, indium and aluminum, 0.25 wt. % binder, 0.125 wt. % functionalized barium sulfate, 0.25 wt. % zinc oxide, 0.05 wt. % $Bi_2O_3$ (preferably nano-sized), and 0.04 wt. % indium hydroixde. The electrolyte is 33 wt. % KOH with a fluorosurfactant added at the equivalent of 40 ppm of the zinc weight. This preferred anode is in addition to the anode formulations discussed above, and other embodiments of the holistic cell design and air electrode may still realize benefits even when using more conventional anode formulations.

EXAMPLE

Three carbons were selected according to their source, as described above. A series of sample cells were made while varying the amounts of each carbon and binder according to the table 2 below.

TABLE 2

Dry coating mixtures for analysis.

| Component 1 A: PWA | Component 2 B: Darco | Component 3 C: M2-23 | Component 4 D: 6CX |
|---|---|---|---|
| 0.000 | 0.000 | 85.000 | 15.000 |
| 0.000 | 85.000 | 0.000 | 15.000 |
| 28.333 | 28.333 | 28.333 | 15.000 |
| 41.250 | 0.000 | 41.250 | 17.500 |
| 89.000 | 0.000 | 0.000 | 15.000 |
| 41.250 | 41.250 | 0.000 | 17.500 |
| 13.750 | 53.750 | 13.750 | 18.750 |
| 0.000 | 41.250 | 41.250 | 17.500 |
| 80.000 | 0.000 | 0.000 | 20.000 |
| 0.000 | 80.000 | 0.000 | 20.000 |
| 28.333 | 28.333 | 28.333 | 15.000 |
| 0.000 | 0.000 | 80.000 | 20.000 |

Each of the mixtures was subjected to two stage mixing with a "pre-blend" for 5 minutes at a tumble rate of 20 rpm and an impeller speed of 500 rpm. High shear mixing was induced for 15 minutes at a tumble rate of 30 rpm and an impeller speed of 3350 rpm. All mixing was conducted in a one gallon vessel using a 6 inch impeller. Air electrodes were then manufactured with an anilox lamination roll for moderate to high pore compression. All other cell components and design features for an AZ13 sized cell were held constant.

These air electrodes were then characterized for various performance criteria to identify the optimal formulation. Since the ability to reduce oxygen is directly associated with carbon properties, the rate capability of the cell is an important property and helps to support the data generated for air electrodes on bench top testing shown above. First, the current that the cell can support at 1.1 volt for one minute was measured. Results are shown in the ternary diagrams of FIGS. 5A and 5B. Past work has shown non-anilox electrodes result in a value of about 8 mA on this test, whereas all iterations of the mixtures in the Figure outperform significantly. In fact, it is believed the change to pattern lamination dominates the rate capability, and there appears to be as much of an influence from Teflon content, 15% (FIG. 5A) vs. 20% (FIG. 5B) as there is from the type of carbon on this test.

Additional, more conventional service and performance tests were also performed. Understanding that IEC Standard tests, 3 mA for AZ13 (i.e., 9 mA/cm$^2$) and IEC HR tests are all dominated by the anode performance, these tests focused on the Wireless Service test, 5 mA continuous for AZ13 (i.e., 15.4 mA/cm$^2$) and "air up" time (i.e., the amount of time it takes for oxygen to initially diffuse into the cell to operate under standardized conditions).

FIGS. 6A (at 15% Teflon) and 6B (at 20% Teflon) show the optimal mixtures for the Wireless test. FIGS. 7A (at 15% Teflon) and 7B (at 20% Teflon) reflect 5 mA continuous. FIGS. 8A (at 15% Teflon) and 8B (at 20% Teflon) reflect air-up time. Based upon the foregoing, the light colored space in FIG. 9 represents the inventors' preferred formulation range. As noted above, all three carbons are preferably included or at least a hard carbon and one active carbon are included, so that the extremes of this graph (or any of the others) should be interpreted accordingly.

For all of the FIGS. 5-9, the amounts of carbon are expressed in weight percentages, and the contour lines along the interior of each compositional triangle represent expected performance at the triangulated mixture represented by that point. To that end, the bottom axis of the triangle represents component A (i.e., PWA carbon, an activated, coal-based carbon), the top right axis represents component B (i.e., Darco G-60 a plant/lignin-based carbon) on a similar scale, and the top left is component C (i.e., M2 carbon, a hard, polymer-based carbon). All three axes contemplate a maximum of 80 wt. % for that component.

The foregoing description identifies various non-limiting embodiments of the invention. Modifications may occur to those skilled in the art and to those who may make and use the invention. The disclosed embodiments are merely for illustrative purposes and not intended to limit the scope of the invention or the subject matter set forth in the claims.

What is claimed is:

1. An electrochemical cell comprising:
    an anode including zinc;
    a laminated air electrode comprising dry components including a manganese dioxide catalyst, a mixture of carbons, and a binder that is both fibrillated and particulate coated to at least a portion of the carbons, and wherein the mixture of carbons includes a hard carbon and at least one activated carbon; and
    an electrolyte including potassium hydroxide.

2. The cell according to claim 1, wherein the anode further comprises at least one selected from: fumed silica, functionalized barium sulfate and a sulfotricarballylate fluorosurfactant.

3. The cell according to claim 1 wherein the laminated air electrode has a consistent pattern of at least one of protrusions and indentations along one surface of the laminated air electrode.

4. The cell according to claim 3 wherein the at least one of protrusions and indentations were created with an anilox roller.

5. A method of manufacturing a miniature zinc-air electrochemical cell, the method comprising:
    selecting a mixture of carbons including a hard carbon and at least one activated carbon;
    subjecting the mixture of carbons to two-stage mixing including high shear in the presence of a manganese dioxide catalyst and a binder that is both fibrillated and particulate coated to at least a portion of the carbons so as to induce the formation of particles and fibers;
    forming an air electrode from the mixture of carbons, binder, and the manganese dioxide catalyst;
    laminating a hydrophobic layer to one side of the air electrode using an anilox roller;
    providing an anode including zinc; and
    providing an electrolyte including potassium hydroxide.

6. The method of claim 5 further comprising introducing fumed silica prior to forming the air electrode.

* * * * *